United States Patent
Quinn et al.

(10) Patent No.: US 8,425,678 B2
(45) Date of Patent: Apr. 23, 2013

(54) LOW ODOR ASPHALT COMPOSITIONS AND LOW ODOR ASPHALT PRODUCED THEREFROM

(75) Inventors: Robert E. Quinn, Planefield, IL (US); Jay W. Keating, Summit Tinley Park, IL (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 841 days.

(21) Appl. No.: 12/343,664

(22) Filed: Dec. 24, 2008

(65) Prior Publication Data

US 2009/0314184 A1    Dec. 24, 2009

Related U.S. Application Data

(60) Provisional application No. 61/073,484, filed on Jun. 18, 2008.

(51) Int. Cl.
| | | |
|---|---|---|
| C08L 95/00 | (2006.01) | |
| C08L 101/08 | (2006.01) | |
| C09D 195/00 | (2006.01) | |
| C09D 201/08 | (2006.01) | |
| C09D 5/00 | (2006.01) | |
| C08F 8/28 | (2006.01) | |
| C08K 5/07 | (2006.01) | |

(52) U.S. Cl.
USPC ............. 106/273.1; 106/285; 106/287.24; 106/499; 525/50

(58) Field of Classification Search ........... 106/273.1, 106/285, 287.24, 499; 525/50
See application file for complete search history.

(56) References Cited

U.S. PATENT DOCUMENTS

| | | | |
|---|---|---|---|
| 3,156,542 | A | 11/1964 | Younghouse |
| 3,615,801 | A | 10/1971 | Marklow et al. |
| 3,911,193 | A | 10/1975 | Resz et al. |
| 4,069,064 | A | 1/1978 | Nett et al. |
| 4,147,212 | A | 4/1979 | Tisdale |
| 449,987 | A | 5/1984 | Lindauer |
| 4,449,987 | A | 5/1984 | Lindauer |
| 4,465,493 | A | 8/1984 | Attar |
| 5,271,767 | A | 12/1993 | Light, Sr. et al. |
| 5,362,316 | A | 11/1994 | Paradise |
| 5,840,809 | A | 11/1998 | Ohtsuka et al. |
| 5,989,662 | A | 11/1999 | Janicki et al. |
| 6,069,194 | A | 5/2000 | Franzen |
| 6,107,373 | A | 8/2000 | Janicki et al. |
| 6,156,833 | A | 12/2000 | Rauls |
| 6,313,367 | B1 | 11/2001 | Breen |
| 6,461,421 | B1 | 10/2002 | Ronvak |
| 6,488,988 | B2 | 12/2002 | Trumbore et al. |
| 6,749,677 | B2 | 6/2004 | Freistler |
| 6,764,542 | B1 | 7/2004 | Lackey et al. |
| 6,987,207 | B1 | 1/2006 | Ronyak |
| 7,037,955 | B2 | 5/2006 | Timcik et al. |
| 7,157,411 | B2 | 1/2007 | Rohde et al. |
| 7,252,755 | B2 | 8/2007 | Kiser et al. |
| 2005/0223668 | A1 | 10/2005 | Thompson et al. |
| 2006/0155003 | A1 | 7/2006 | Timcik et al. |
| 2008/0146477 | A1 | 6/2008 | Mentink et al. |
| 2009/0012214 | A1 | 1/2009 | Butler et al. |
| 2009/0145330 | A1 | 6/2009 | Draper et al. |

FOREIGN PATENT DOCUMENTS

| | | |
|---|---|---|
| GB | 1 413 323 | 11/1975 |
| JP | 2007-137922 | * 6/2007 |

OTHER PUBLICATIONS

MSDS for Nujol, last revision date (Feb. 26, 2008).*
Infrared Spectroscopy (Dec. 8, 1997).*
"Vanillin" NIST, Chemistry Webbook, (2011).*
"Incorporating IR/NMR date into your lab report", Clark College, (Feb. 2008).*
"Evaluated Infrared Reference Spectra" Stein, S.E., (no date available).*
The Condensed Chemical Dictionary, Hawley, ed., p. 481 (ca. 1920).*
The Coblentz Society Desk Book of Infrared Spectra, Smith, A.L. (1982).*
Lange et al. "Commercial Odor-Reducing Agents for Minimizing the Odor Potential of Asphalt Binders", Journal of Environmental Engineering, Apr. 2006.
Hartman, Thomas G., "Composition of Vanilla Beans from Different Geographical Regions", CAFT, Rutgers University, 2003.
Kirk-Othmer, Encyclopedia of Chemical Technology, vol. 3, Third 3d. (1978), pp. 284-327, John Wiley & Sons, NY, 46 pgs.
"A Brief Introduction to Asphalt and some of its uses", Manual Series No. 5 (MS-5), The Asphalt Institute, 7th Ed, Sep. 1974, 8 pgs.

* cited by examiner

Primary Examiner — David M Brunsman
(74) Attorney, Agent, or Firm — Calfee, Halter & Griswold LLP

(57) ABSTRACT

A composition for reducing undesirable odors emitted by hydrocarbonaceous materials is provided. The composition contains at least one aldehyde-containing compound and, optionally, one or more ketone-containing compound and/or a carrier. The composition is free of ester-containing compounds. In at least one exemplary embodiment, the composition contains one or more aldehyde-containing compounds and a liquid carrier. The aldehyde-containing compound(s) has a molecular weight greater than 100 daltons and may be chosen from vanillin or cinnamaldehyde. The ketone-containing compound(s) has a molecular weight greater than 100 daltons, and in exemplary embodiments, from about 120 to about 1,000 daltons. Undesirable odors from hot asphalt are reduced by the composition without adversely affecting the physical and performance properties of the asphalt or decreasing the flash point of the asphalt. The composition may be added to asphalt in a molten or semi-molten form to reduce or eliminate unpleasant odors and form a low odor asphalt.

20 Claims, 2 Drawing Sheets

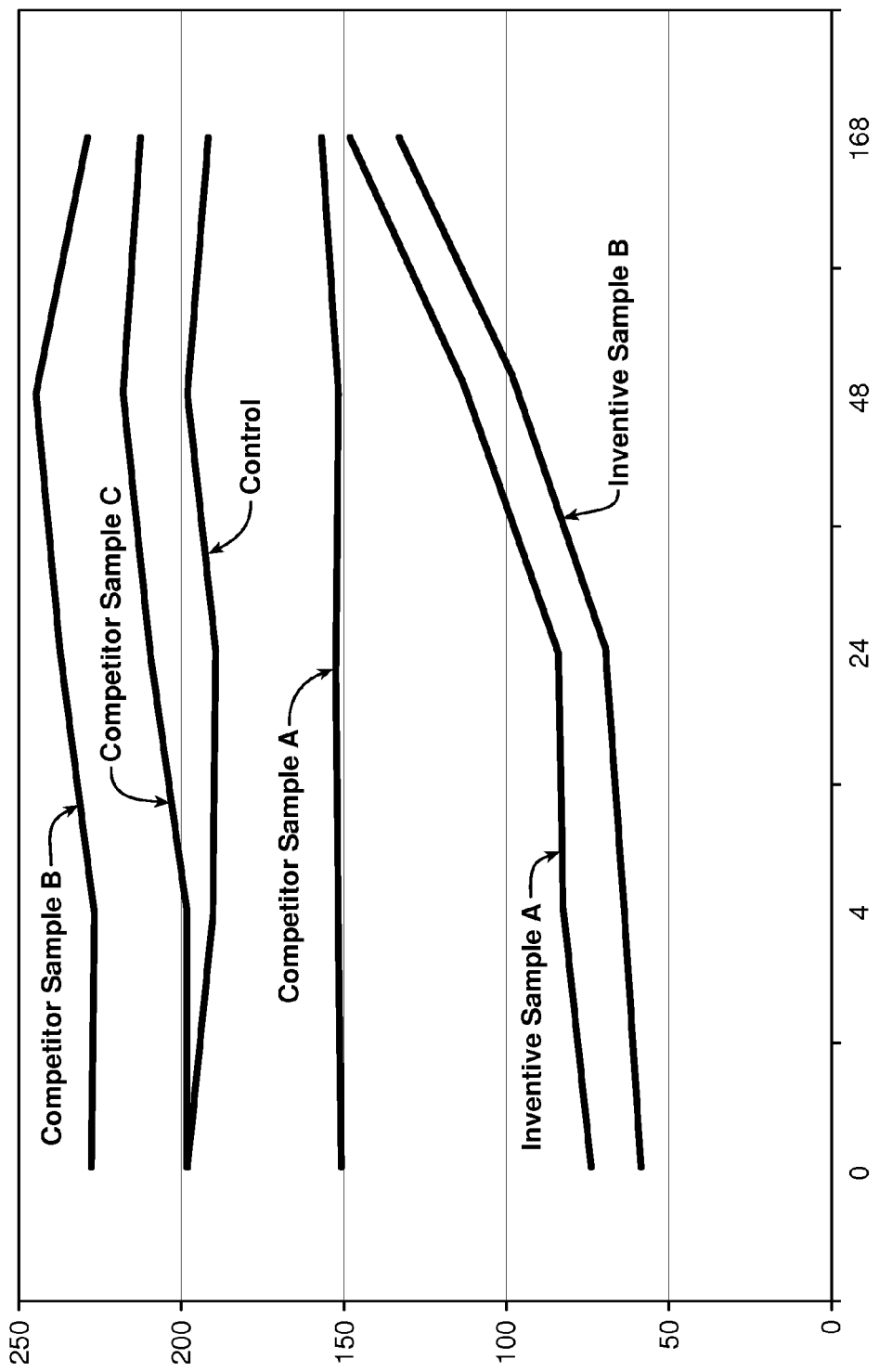

LOW ODOR ASPHALT COMPOSITIONS AND LOW ODOR ASPHALT PRODUCED THEREFROM

CROSS REFERENCE TO RELATED APPLICATIONS

This application is related to and claims domestic priority benefits from U.S. Provisional Patent Application Ser. No. 61/073,484 entitled "Low Odor Asphalt Composition" filed Jun. 18, 2008, the entire content of which is expressly incorporated herein by reference.

TECHNICAL FIELD AND INDUSTRIAL APPLICABILITY OF THE INVENTION

The present invention relates generally to odor-emitting hydrocarbonaceous compounds, and more particularly, to compositions for reducing the undesirable or unpleasant odors emitted from bituminous compounds.

BACKGROUND OF THE INVENTION

Asphalt-based roofing materials, such as roofing shingles, roll roofing, and built-up roofing, are installed on the roofs of buildings and residential dwellings to provide protection from the elements. When asphalt is used in roofing applications, the asphalt is first heated in a vessel, such as a gas-fired roofing kettle. As the temperature of the asphalt rises, volatile materials, such as hydrocarbons, sulfides, and mercaptans, are emitted that can have strong, unpleasant, and potentially harmful odors. The odors emitted are not only unpleasant to smell, but they may also be an irritant to workers and/or other individuals in the vicinity of the vessel or to those who come within close range of the hot asphalt. For instance, the odorous fumes from the asphalt may cause headaches and/or irritation to the eyes and mucus membranes of the nose and throat, which can result in a deterioration of worker productivity and/or in increase in the number of sick days taken by workers.

Compositions and odor-masking additives for reducing undesirable odors emitted from odor-causing compounds are known in the art. Non-limiting examples of such compositions and odor-masking additives are set forth below.

U.S. Pat. No. 5,271,767 to Light, Sr., et al. discloses a composition that consists essentially of (1) liquid asphalt, hot-mix asphalt, hot-mix, or cold lay asphalt with added latex and (2) an additive that contains a citrus terpene (4-isopropyl 1-methylcyclohexene) D-limonene mixed with a vegetable oil such as cottonseed oil, soya oil, rapeseed (canola) oil, peanut oil, etc. and a silicone oil dispersant. It is taught that when 0.5-1.0 parts of the composition are mixed with 99.0-99.5 parts liquid asphalt, the resulting liquid asphalt composition is substantially free of objectionable odors.

U.S. Pat. Nos. 5,989,662 and 6,107,373 to Janicki, et al. disclose methods of reducing fumes produced from a kettle of molten asphalt that includes adding about 0.25 to about 6.0% by weight of a polymer (e.g. polypropylene) to the asphalt. The polymer material preferably forms a skim or skin across substantially the entire upper surface of the asphalt. Janicki teaches that at least a 25% reduction of the visual opacity of the fumes, at least a 20% reduction of the hydrocarbon emissions of the fumes, and at least a 15% reduction of suspended particulate emissions of the fumes is obtained.

U.S. Pat. No. 6,461,421 to Ronvak discloses a composition that includes (1) an odor-emitting hydrocarbonaceous material, (2) an odor-suppressing amount of an aldehyde or a ketone, and (3) a carboxylic acid ester. The odor-emitting hydrocarbonaceous material may be any hydrocarbonaceous material that emits objectionable odors at ambient or elevated temperatures. One example of a hydrocarbonaceous material given is asphalt. It is asserted that the composition significantly reduces the odor given off by asphalt.

U.S. Pat. No. 6,488,988 to Trumbore, et al. discloses a method and container for reducing the fuming of asphalt in a heated vessel. Trumbore teaches that a substantially insoluble blanket material is added to the liquid asphalt to form a skim on the surface of the asphalt and reduce the fuming. Examples of blanket materials include polyurethane, polyethylene terephthalate, ground soda bottles, starch, and cellulosic materials.

U.S. Pat. No. 6,987,207 to Ronvak discloses a composition that includes an odor-emitting hydrocarbonaceous material and an odor-suppressing amount of an additive composition that includes (1) a soy methyl ester, (2) at least one aldehyde and/or at least one ketone, and (3) at least one carboxylic acid ester. Ronvak teaches that the odor-emitting hydrocarbonaceous material may be any hydrocarbonaceous material that emits objectionable odors at ambient or elevated temperatures, such as asphalt. It is asserted that the use of the additive composition may significantly reduce or eliminate the odor emitted by the hydrocarbonaceous material.

U.S. Pat. No. 7,037,955 to Timcik and U.S. Patent Publication No. 2006/0155003 to Timcik, et al. disclose methods for reducing odor in an oil based medium such as asphalt. In the disclosed methods, an essential oil is added to the oil based medium in an odor reducing amount. The essential oil may be one or more essential oils or essential oil components, and includes natural extracts of various products of aromatic plants and trees. Essential oils for use in the invention include ajowan, angelica root, angelica seed, aniseed china star, carrot seed, and fir needle, among many others. Examples of essential oil components include terpenes, alcohols, aldehydes, aromatics, phenolics, esters, terpene derivatives, non-terpene essential oil components, and terpene derivatives.

U.S. Patent Publication No. 2005/0223668 to Thompson, et al. discloses a faced fibrous insulation assembly that includes a fibrous blanket, a facing formed by a kraft paper sheet material, and an asphalt coating layer on the inner surface of the facing that bonds the facing to the fibrous insulation blanket. The asphalt coating layer contains an odor-reducing additive in an amount to substantially eliminate odors that would otherwise be emitted by the asphalt coating layer. It is asserted that the additive does not adversely affect the adherent qualities of the asphalt coating layer. It is disclosed that the odor-reducing additive may be essential plant oils.

Conventional odor treating compositions commonly act as deodorizers or masking agents, essentially overwhelming the undesirable odor with one or more desirable odors. However, these compositions do not effectively mask the odors emitted from asphalt. Thus, there remains a need in the art for a composition that effectively reduces or eliminates the odors emitted from asphalt or other hydrocarbonaceous materials without simply masking the undesirable smell, where the performance of the composition is sustainable over time, and where the composition does not pose any additional health or safety issues.

SUMMARY OF THE INVENTION

It is an object of the present invention to provide a composition for reducing malodorous emissions from hydrocarbonaceous materials that includes at least one aldehyde-containing compound that has a molecular weight greater than about 100 daltons and a boiling point greater than about 375° F. In exemplary embodiments, the aldehyde-containing compound has a molecular weight from about 120 to about 1,000 daltons. Additionally, the composition is free of ester-containing compounds. The composition reduces undesirable odors from asphalt without adversely affecting the physical and performance properties of the asphalt. The composition may further include at least one ketone-containing compound, a low fuming additive, and/or a liquid carrier. The ketone-containing compound has a boiling point greater than about 375° F. and a molecular weight greater than about 100 daltons. In one exemplary embodiment, the aldehyde-containing compound is attached to a polymer to form a polymer/aldehyde compound having a molecular weight from about 1,000 to about 10,000,000 daltons. Acceptable carriers for use in the composition include compounds that are ester-free, have a boiling point greater than about 375° F., and have low to no toxicity or other safety issues.

It is also an object of the present invention to provide a low odor asphalt that includes asphalt and an odor reducing amount of a composition that includes one or more aldehyde-containing compounds with a molecular weight greater than about 100 daltons and a boiling point greater than about 375° F. The composition may be added to asphalt in a molten or semi-molten form to reduce or eliminate unpleasant odors that are emitted from the asphalt upon heating. In addition, the composition reduces asphalt's undesirable odors in the absence of ester-containing compounds, and without adversely affecting the physical and performance properties of the asphalt. The composition may further include one or more members selected from at least one ketone-containing compound, a low fuming additive, and/or a liquid carrier. As discussed above, the ketone-containing compound may have a boiling point greater than about 375° F. and a molecular weight greater than about 100 daltons.

It is a further object of the present invention to provide a method for reducing odor in a hydrocarbonaceous material that includes mixing an odor reducing amount of a composition that is free of ester-containing compounds and that includes at least one aldehyde-containing compound to a hydrocarbonaceous material. In at least one embodiment, the hydrocarbonaceous material is asphalt. The aldehyde-containing compound may have a molecular weight greater than about 100 daltons and a boiling point greater than about 375° F. In addition, the composition may include a ketone-containing compound and/or a liquid carrier. The composition may be added in small increments up to 5% by volume of the asphalt, and in exemplary embodiments, up to 1% by volume of the asphalt. The ketone-containing compound has a molecular weight greater than about 100 daltons and a boiling point greater than about 375° F. The carrier is chosen such that there are little or no safety issues, the carrier is free of ester-containing compounds, and has a boiling point greater than about 375° F.

It is an advantage of the present invention that the composition reduces the measured volatile impurities in asphalt that are responsible for the odor emissions.

It is also an advantage of the present invention that the composition and low-odor asphalt produced with the composition do not pose any safety or health issues to workers involved in their manufacture and/or application.

It is yet another advantage of the present invention that the addition of the composition to the asphalt does not adversely affect the physical and performance properties or the flash point of the asphalt.

It is a further advantage of the present invention that the composition does not negatively affect the asphalt so that the asphalt may be used for its intended purpose.

It is a feature of the present invention that the composition reduces unpleasant or undesirable odors from asphalt in the absence of ester-containing compounds.

It is another feature of the present invention that an aldehyde-containing compound may be attached to a polymer to form a polymer/aldehyde compound with a molecular weight from about 1,000 to about 10,000,000 daltons.

It is also a feature of the present invention that the carriers are ester-free and have low to no toxicity or other safety issues.

It is yet another feature of the present invention that the low-odor asphalt may be used in built-up-roofing applications.

It is a further feature of the present invention that the addition of a low fuming agent has a synergistic affect on the odor reducing potential.

It is yet another feature of the present invention that the composition may be used in conjunction with other odor-reducing methods such as, for example, with a polymer that forms a skim on the surface of the molten asphalt to retain at least a portion of the fumes and odors emitted from the asphalt within the heated vessel and/or with mechanical methods.

The foregoing and other objects, features, and advantages of the invention will appear more fully hereinafter from a consideration of the detailed description that follows.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a graphical illustration the total amount of impurities emitted from Type III asphalt, both treated and untreated, at 270° C. for over a time period of 168 hours.

DETAILED DESCRIPTION AND PREFERRED EMBODIMENTS OF THE INVENTION

Figure 1:
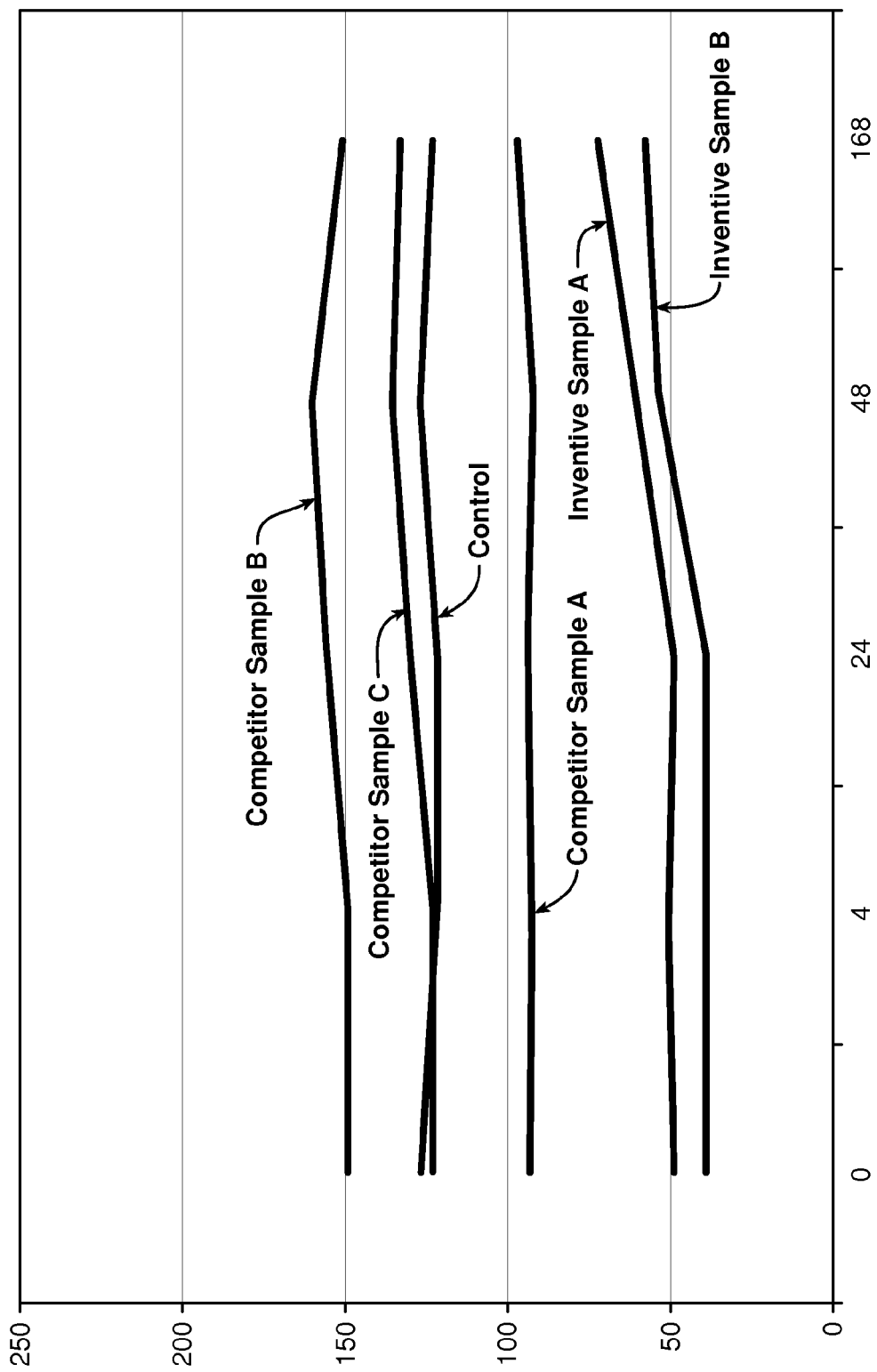
FIG. 1 is a graphical illustration the total amount of impurities emitted from Type III asphalt, both treated and untreated, at 230° C. for over a time period of 168 hours.

Unless defined otherwise, all technical and scientific terms used herein have the same meaning as commonly understood by one of ordinary skill in the art to which the invention belongs. All references cited herein, including published or corresponding U.S. or foreign patent applications, issued U.S. or foreign patents, or any other references, are each incorporated by reference in their entireties, including all data, tables, figures, and text presented in the cited references. The term "composition" and "inventive composition" may be used interchangeably herein.

The present invention relates to a composition that reduces the emission of undesirable or objectionable odors from asphalt or other hydrocarbonaceous materials. The composition is a concentrated form of active materials that are used by adding the concentrate to molten or semi-molten asphalt. The inventive composition reduces the measured volatile impurities that are responsible for the malodorous odor emissions in the hydrocarbonaceous materials. The hydrocarbonaceous material may be any hydrocarbonaceous material that emits undesirable or objectionable odors at ambient and/or elevated temperatures. Generally, the higher the temperature, the greater the amount of odors and fumes that are emitted from the hydrocarbonaceous material. Although the inventive composition may be employed to reduce odors from any hydrocarbonaceous or bituminous material, for ease of discussion, asphalt, one exemplary hydrocarbonaceous/bituminous material, will be discussed herein.

The inventive composition contains at least one aldehyde-containing compound and optionally, one or more ketone-containing compound and/or liquid carrier. Optionally, a low fuming additive may also be included in the composition. Undesirable odors from hot asphalt are reduced by the composition without adversely affecting the physical and performance properties of the asphalt or decreasing the flash point of the asphalt. Additionally, the composition of the present invention advantageously reduces malodorous emissions from asphalt in the absence of ester-containing compounds.

The composition includes one or more aldehyde-containing compounds that have a boiling point of at least about 375° F., and in some embodiments, at least about 450° F. The aldehyde-containing compounds have a molecular weight greater than about 100 daltons. In at least one embodiment, the aldehyde-containing compounds have a molecular weight from about 100 to about 10,000 daltons, from about 120 to about 1,000 daltons, and from about 120 to about 500 daltons. It is considered to be within the purview of the instant invention to attach an aldehyde-containing compound to a polymer to form a polymer/aldehyde compound or to form polymeric compositions with the aldehyde-containing compound that may have molecular weights from about 1,000 to about 10,000,000 daltons. As used herein, the term "molecular weight" is meant to denote a weight average molecular weight. Non-limiting examples of suitable aldehyde-containing compounds for use in the composition include 2-chlorobenzaldehyde, 4-chlorobenzaldehyde, alpha-methylcinnamaldehyde, 4-anisaldehyde, epsilon-cinnamaldehyde, vertraldehyde, 4-ethoxy-3-methoxybenzaldehyde, 3-ethoxy-4-hydroxybenzaldehyde, 3-nitrobenzaldehyde, vanillin, and cinnamaldehyde.

In at least one embodiment, the aldehyde-containing compound is vanillin and, in an exemplary embodiment, the composition of formed solely of vanillin. The aldehyde-containing compound(s) may be present in the composition in an amount up to 100% by weight. In at least one exemplary embodiment, the aldehyde-containing compound is present in the composition in an amount from about 0.5% to about 100% by weight, and, in another embodiment, from about 2.0% to about 40% by weight, and in yet another embodiment, from about 5.0% to about 25% by weight. The term "% by weight" as used herein indicates a percent by weight based on the total composition. It is to be appreciated that the amount active ingredients present in the composition can vary depending on how concentrated a composition is desired.

Additionally, the composition may include at least one ketone-containing compound having a boiling point of at least about 400° F., and in exemplary embodiments, a boiling point of at least about 450° F. The molecular weight of the ketone-containing compound may be greater than about 100 daltons, and may range from about 100 to about 10,000 daltons, from about 120 to about 1,000 daltons, and from about 120 to about 500 daltons. Suitable examples of ketone-containing compounds for use in the inventive composition include, but are not limited to, camphor, isophorone, isobutyrophenone, propiophenone, 4-methylacetophenone, carvone, 4-chloroacetophenone, 2-benzoylbenzoic acid, 2'-acetonaphthone, benzophenone, fluorenone, 4'-ethoxyacetophenone, 4'-chlorobenzophenone, 4-acetylbenzonitrile, and 4'-hydroxyacetophenone. In at least one embodiment, the ketone-containing compound(s) is present in the composition in an amount from about 0 to about 75% by weight. In at least one exemplary embodiment, the ketone-containing compound(s) is present in the composition in an amount from about 2% to about 40% by weight, and in another exemplary embodiment, from about 5% to about 30% by weight. It is considered to be within the scope of the invention to attach a ketone-containing compound to a polymer and form a polymer/ketone compound or form polymeric compositions with the ketone-containing compound that may have molecular weights from about 1,000 to about 10,000,000 daltons.

In addition, the composition may contain one or more compounds to dissolve or disperse the specific aldehyde-containing and ketone-containing compounds utilized in the inventive composition. The carrier compound is chosen such that there are little or no safety issues. Acceptable liquid carriers include compounds that are ester-free (i.e. does not contain ester groups), have a boiling point greater than about 400° F., and are non-toxic. A non-exhaustive list of suitable carrier compounds includes alkylphenol ethyoxylates (e.g., alkoxy-nonylphenols and alkoxy-octylphenols), alkanolamines, alkylaryl sulfonates, betaines, ethoxylated alcohols, ethoxylated amines, ethoxylated amides, imidazolines, olefin sulfonates, silicones, mineral oils, and poly α-olefins. The carrier compounds may be used singly or in combination, and may be chosen based on the specific components in the composition.

A composition containing an aldehyde-containing compound (excluding one or more ketone-containing compounds) may be formed by adding the aldehyde-containing compound(s) to a carrier solution and mixing the aldehyde-containing compound(s)/carrier mixture to distribute the aldehyde-containing compound(s) substantially evenly throughout the carrier solution. When a ketone-containing compound is present in the composition, the composition may be formed by adding the aldehyde-containing compounds and ketone-containing compounds, singly or simultaneously, to a carrier solution in a suitable high or low intensity mixing apparatus. The mixture may then be agitated for a sufficient amount of time to distribute the aldehyde-containing compound(s) and ketone-containing compound(s) throughout the carrier solution. Heat may also be provided to assist in dissolving the aldehyde-containing and/or ketone-containing compound(s) in the carrier solution.

The composition described above may be added to any hydrocarbonaceous material and/or asphalt in a molten or semi-molten form to reduce or eliminate unpleasant odors that are emitted from the hydrocarbonaceous material and/or asphalt upon heating and form a low odor hydrocarbonaceous material and/or asphalt. It is to be appreciated that it was discovered that the inventive composition reduces asphalt's undesirable odors in the absence of ester-containing compounds, and without adversely affecting the physical and performance properties of the asphalt. Additionally, the composition reduces the measured volatile impurities that are responsible for the unpleasant or undesirable odor emissions. As used herein, the term "asphalt" is meant to include any of a variety of materials that are solid or semi-solid materials at room temperature that gradually liquefy when heated and are formed predominantly of naturally occurring bitumens that are obtained as residue in petroleum refining. The inventive composition is added to the asphalt in an amount sufficient to reduce the unpleasant or objectionable odors, and in exemplary embodiments, may be added in small increments up to 5% by volume of the asphalt, from about 0.1% to about 5.0% by volume of the asphalt, or from 0.5% to about 1.0% by volume of the asphalt. In exemplary embodiments, the asphalt is added in small increments up to 1% by volume of the asphalt. Asphaltic treatment levels may be in the range from 1:500 gallons to 1:20 gallons, and in exemplary embodiments, from 1:3,000 gallons to 1:12,000 gallons.

Although not wishing to be bound by theory, it is believed that the aldehyde-containing and ketone-containing compounds bond either chemically or physically with the chemical species in the asphalt that are responsible for the objectionable odors to reduce their volatility and thus eliminate (e.g., "cancel out") the undesirable odors. The composition of the instant invention does not simply mask the odor by covering the odor with a fragrance or a multiplicity of fragrances. The low odor asphalt obtained by the combination of the inventive composition and asphalt may be used in roofing and paving applications as well as for weather sealing, roofing cements, mastics, driveway sealers, and vapor sealers. Additionally, the low odor asphalt may be used in hot applied products, such as, but not limited to waterproofing, damp proofing, battery sealers, drilling muds, canal liners, shingle manufacturing, and single ply and commercial roofing manufacturing.

In one embodiment, the low-odor asphalt may be used in built-up-roofing applications. Here, the low odor asphalt is applied between the various layers forming the built-up roofing system. For example, a base layer of rigid roof insulation may be installed on a roof surface, followed by a first layer of the inventive low odor asphalt. A cover board may then be applied over the first asphalt layer. Alternating layers of ply sheets and asphalt are positioned over the cover layer in a shingled fashion. These multiple plies are fused together to form a monolithic, waterproof barrier. A final coating may be positioned on the asphalt-saturated cover layers. In some exemplary embodiments, the outmost layer or coating has an aesthetically pleasing surface.

In another exemplary embodiment of the invention, the odor-reducing composition (excluding the optional carrier) is packaged in a consumable material so that it can be melted along with the asphalt. The composition is pre-packaged in the consumable material, which is then shipped to the consumer. The consumer is able to add the composition on-site to reduce the odiferous impurities in the asphalt by placing the packaged composition in the molten or semi-molten asphalt. The consumable material used to form the solid package is not particularly limited so long as it does not adversely affect the properties of the asphalt and does not require undue mixing to melt and distribute the odor-reducing composition within the asphalt.

Additionally, the composition may be used in conjunction with other odor-reducing methods such as, for example, with a polymer (i.e., low fuming additive) that forms a skim or skin on the surface of the molten asphalt to retain at least a portion of the fumes and odors emitted from the asphalt within the vessel. The term "vessel" includes any container suitable for holding molten asphalt. Such a utilization of a polymer to form a viscous skim is disclosed in U.S. Pat. No. 6,069,194 to Franzen, et al., which issued on May 30, 2000 and in U.S. Pat. No. 6,107,373 to Janicki, et al., which issued on Aug. 22, 2000, the contents of which are expressly incorporated herein in their entireties. The combination of the polymer skim and the reduction in odiferous emissions by the inventive composition results in a substantially odor-free asphalt. Fume control methods that incorporate after-burners and/or filtering systems may be utilized to prevent a "flashing" of the fumes.

Such a skim-forming polymer may also be utilized together with the inventive composition while packaging the asphalt in the consumable material described above. Accordingly, the packaged material would contain the inventive composition, the low fuming additive (i.e., polymer), and asphalt. When the packaged material is placed into the heated vessel, the asphalt melts, and the composition and polymer are mixed with the asphalt to reduce the odors emitted therefrom.

The composition of the present invention provides numerous advantages, such as, for example, the addition of the composition to asphalt does not adversely affect the physical or performance properties of the asphalt or affect the flash point of the asphalt. Additionally, the composition does not negatively modify the asphalt. Accordingly, the asphalt may be used for its desired purpose without any undesirable modification. In addition, the composition has little or no toxicity or safety issues. As a result, no additional safety precautions or equipment are needed.

Having generally described this invention, a further understanding can be obtained by reference to certain specific examples illustrated below which are provided for purposes of illustration only and are not intended to be all inclusive or limiting unless otherwise specified.

EXAMPLES

In the following examples, headspace chromatography was used to measure the odor emissions from the individual samples. In particular, 0.5 grams of the sample were coated onto 15 g of 3 mm glass beads. After the sample was coated onto the glass beads, the headspace vial was sealed and placed in the headspace sampler. Agitation was used to increase the transfer of VOCs from the asphalt into the headspace. One ml of the headspace gas was measured by gas chromatography. In addition, a flame ionization detector (FID), an electron capture detector (ECD), and a flame photometric detector (FPD) were used to analyze the headspace gas.

Example 1

Odor Reducing Potential of Aldehydes

Various aldehyde-containing compounds were tested to determine their individual odor reducing potential on odor emitting compounds found in asphalt. In this experiment, aldehyde-containing compounds were added to asphalt and the odor emissions were measured by headspace gas chromatography as described above. The results are set forth in Table 1.

TABLE 1

Odor Reducing Potential of Aldehyde-Containing Compounds

|  | Benzaldehyde | Cinnamaldehyde | Vanillin | Phenylpropionaldehyde | Blend[(1)] |
|---|---|---|---|---|---|
| Hydrogen sulfide | 0.76 | 0.66 | 0.58 | 0.83 | 0.69 |
| Butane thiol | 0.71 | 0.67 | 0.54 | 0.79 | 0.75 |
| Thiopene | 0.21 | 0.21 | 0.19 | 0.42 | 0.20 |
| 2-methyl thiopene | 0.47 | 0.45 | 0.43 | 0.66 | 0.35 |

TABLE 1-continued

Odor Reducing Potential of Aldehyde-Containing Compounds

|  | Benzaldehyde | Cinnamaldehyde | Vanillin | Phenylpropionaldehyde | Blend[1] |
|---|---|---|---|---|---|
| Ethyl thiopene | 0.45 | 0.46 | 0.41 | 0.70 | 0.39 |
| Pentane thiol | 0.53 | 0.55 | 0.49 | 0.78 | 3.84 |
| Hexane thiol | 0.61 | 0.57 | 0.49 | 0.78 | 0.49 |
| Dimethyl disulfide | 0.41 | 0.39 | 0.33 | 0.67 | 0.35 |
| Dibenzothiophene | 0.45 | 0.43 | 0.35 | 0.58 | 0.40 |
| Butyl dibenzothiophene | 0.55 | 0.52 | 0.36 | 0.74 | 0.33 |
| Benzene thiol | 0.20 | 0.19 | 0.19 | 0.54 | 0.14 |
| Methylbenzenethiol | 0.37 | 0.36 | 0.24 | 0.80 | 0.32 |
| o-cresol | 0.49 | 0.46 | 0.39 | 0.60 | 0.42 |
| p-cresol | 0.48 | 0.43 | 0.36 | 0.37 | 0.45 |
| phenol | 0.29 | 0.28 | 0.25 | 0.34 | 0.25 |
| Dibenzofuran | 0.35 | 0.33 | 0.30 | 0.44 | 0.27 |
| Quinoline | 0.16 | 0.16 | 0.16 | 0.69 | 0.12 |
| Decene | 0.30 | 0.28 | 0.26 | 0.39 | 0.27 |
| Average % Odor Reduction | 57 | 59 | 65 | 38 | 44 |

[1] Blend includes benzaldehyde, cinnamaldehyde, and vanillin

Looking at Table 1, it can be seen that vanillin removed the most overall odors with an average percent reduction of odor of 65%. Cinnamaldehyde was the second best aldehyde-containing compound at odor-removing potential, with an average percent reduction of odor of 59%. Blending the benzaldehyde, cinnamaldehyde, and vanillin resulted in a loss of odor reducing potential compared to the individual components. Thus, it was concluded that the blend of aldehydes did not posses any synergistic effect.

Example 2

Odor Reducing Potential of Ketones

Various ketone-containing compounds were tested to determine their individual odor reducing potential on odor emitting compounds found in asphalt. In this experiment, the ketone-containing compounds were added to asphalt and the odor emissions were measured by headspace gas chromatography as set forth above. The results are set forth in Table 2.

TABLE 2

Odor Reducing Potential of Ketone-Containing Compounds

|  | L-Carvone | Acetophenone | Benzophenone | Blend[1] |
|---|---|---|---|---|
| Hydrogen sulfide | 0.95 | 0.73 | 0.63 | 0.87 |
| Butane thiol | 0.96 | 0.93 | 0.62 | 0.82 |
| Thiopene | 0.91 | 0.85 | 0.72 | 0.37 |
| 2-methyl thiopene | 0.91 | 0.73 | 0.63 | 0.51 |
| Ethyl thiopene | 0.99 | 0.70 | 0.69 | 0.64 |
| Pentane thiol | 1.04 | 0.80 | 0.64 | 0.53 |
| Hexane thiol | 0.91 | 0.70 | 0.56 | 0.49 |
| Dimethyl disulfide | 0.95 | 0.81 | 0.51 | 0.56 |
| Dibenzothiophene | 0.96 | 0.94 | 0.80 | 0.47 |
| Butyl dibenzothiophene | 0.83 | 0.79 | 0.70 | 0.47 |
| Benzene thiol | 0.97 | 0.85 | 0.61 | 0.19 |
| Methylbenzenethiol | 0.99 | 0.80 | 0.58 | 0.30 |
| o-cresol | 0.71 | 0.76 | 0.56 | 0.45 |
| p-cresol | 0.82 | 0.73 | 0.56 | 0.43 |
| Phenol | 0.76 | 0.67 | 0.47 | 0.30 |
| Dibenzofuran | 0.87 | 0.82 | 0.75 | 0.31 |
| Quinoline | 0.89 | 0.90 | 0.58 | 0.14 |
| Decene | 0.87 | 0.82 | 0.43 | 0.34 |
| Average % Odor Reduction | 10 | 20 | 39 | 54 |

[1] Blend includes L-carvone, acetophenone, and benzophenone

Table 2 illustrates that benzophenone had the best odor reducing potential of the ketones tested. Indeed, benzophenone was far more effective at reducing odors from the asphalt than either L-carvone or acetophenone. It can be seen that L-carvone demonstrated a very little reduction in odor of the asphalt components. The blend of L-carvone, acetophenone, and benzophenone demonstrated in improvement over the odor reduction of the individual ketone-containing compounds. Thus, it was concluded that there may be a synergistic effect demonstrated by the blend of ketone-containing compounds.

Example 3

Odor Reducing Potential of Esters

Various ester-containing compounds were tested to determine their individual odor reducing potential on odor emitting compounds found in asphalt. In this experiment, the ester-containing compounds were added to asphalt to measure the reduction in the odiferous compounds found in asphalt. The results were measured by headspace gas chromatography as set forth above. The results are set forth in Table 3.

TABLE 3

Odor Reducing Potential of Ester-Containing Compounds

|  | Benzylacetate | Stepsol ROE-W | Zelec 887 | Dioctyl Adipate |
|---|---|---|---|---|
| Hydrogen sulfide | 0.93 | 0.92 | 0.97 | 0.76 |
| Butane thiol | 0.81 | 0.93 | 0.99 | 0.85 |
| Thiopene | 0.73 | 0.95 | 0.98 | 0.68 |

TABLE 3-continued

Odor Reducing Potential of Ester-Containing Compounds

|  | Benzylacetate | Stepsol ROE-W | Zelec 887 | Dioctyl Adipate |
|---|---|---|---|---|
| 2-methyl thiopene | 0.95 | 1.06 | 1.11 | 0.94 |
| Ethyl thiopene | 0.93 | 1.05 | 1.03 | 0.86 |
| Pentane thiol | 0.78 | 1.07 | 1.04 | 0.78 |
| Hexane thiol | 0.94 | 1.08 | 1.12 | 0.88 |
| Dimethyl disulfide | 0.88 | 1.00 | 1.06 | 0.91 |
| Dibenzothiophene | 0.90 | 0.86 | 0.91 | 0.91 |
| Butyl dibenzothiophene | 0.86 | 1.10 | 0.89 | 0.73 |
| Benzene thiol | 0.87 | 1.01 | 0.94 | 0.79 |
| Methylbenzenethiol | 0.90 | 1.01 | 0.85 | 0.74 |
| o-cresol | 0.61 | 0.90 | 0.86 | 0.68 |
| p-cresol | 0.86 | 0.93 | 0.89 | 0.77 |
| phenol | 0.82 | 0.88 | 0.77 | 0.61 |
| Dibenzofuran | 0.84 | 0.93 | 0.98 | 0.86 |
| Quinoline | 0.72 | 0.90 | 0.96 | 0.72 |
| Decene | 0.75 | 0.83 | 0.89 | 0.58 |
| Average % Odor Reduction | 16 | 3 | 4 | 22 |

Table 3 illustrates that none of the ester-containing compounds were particularly effective at reducing the undesirable odors emitted from the asphalt.

Example 4

Odor Reducing Potential of Blended Compounds

Blends of vanillin, benzaldehyde, acetophenone, and Tergitol/Triton X-100 as set forth in Table 4 were formed and tested to determine the odor reducing potential on odor emitting compounds found in asphalt. The blends were prepared by mixing the components in a conventional mixing device. In this experiment, the blended compounds were added to molten asphalt and the odor emissions were measured by headspace gas chromatography. The results are set forth in Table 5.

TABLE 4

Blended Compounds

|  | Blend 1 % by weight | Blend 2 % by weight | Blend 3 % by weight | Blend 4 % by weight |
|---|---|---|---|---|
| Benzaldehyde | 28.0 | 28.0 | 27.0 | 27.0 |
| Vanillin | 1.0 | 1.0 | 3.0 | 3.0 |
| Acetophenone | 1.0 | 1.0 | 1.0 | 1.0 |
| Tergitol NP-4[a] | 70.0 |  | 69.0 |  |
| Triton X-100[b] |  | 70.0 |  | 69.0 |
| Total | 100.0 | 100.0 | 100.0 | 100.0 |

[a] carrier solution- nonylphenol polyethylene glycol (available commercially from Witco Corp.)
[b] carrier solution - octylphenoxypolyethoxyethanol (available commercially from Union Carbide Corp.)

TABLE 5

Odor Reducing Potential of Blended Compounds

|  | Blend 1 | Blend 2 | Blend 3 | Blend 4 |
|---|---|---|---|---|
| Hydrogen sulfide | 0.65 | 0.58 | 0.67 | 0.65 |
| Butane thiol | 0.73 | 0.65 | 0.68 | 0.69 |
| Thiopene | 0.19 | 0.20 | 0.20 | 0.19 |
| 2-methyl thiopene | 0.40 | 0.36 | 0.42 | 0.39 |
| Ethyl thiopene | 0.41 | 0.38 | 0.39 | 0.37 |
| Pentane thiol | 0.40 | 0.42 | 0.38 | 0.38 |
| Hexane thiol | 0.46 | 0.51 | 0.50 | 0.48 |
| Dimethyl disulfide | 0.37 | 0.38 | 0.35 | 0.35 |
| Dibenzothiophene | 0.37 | 0.40 | 0.42 | 0.39 |
| Butyl dibenzothiophene | 0.40 | 0.33 | 0.33 | 0.31 |
| Benzene thiol | 0.16 | 0.15 | 0.16 | 0.14 |
| Methylbenzenethiol | 0.31 | 0.29 | 0.30 | 0.32 |
| o-cresol | 0.46 | 0.44 | 0.47 | 0.44 |
| p-cresol | 0.44 | 0.47 | 0.44 | 0.44 |
| phenol | 0.26 | 0.26 | 0.28 | 0.26 |
| Dibenzofuran | 0.32 | 0.30 | 0.31 | 0.32 |
| Quinoline | 0.14 | 0.13 | 0.13 | 0.13 |
| Decene | 0.28 | 0.30 | 0.28 | 0.27 |
| Average % Odor Reduction | 62 | 64 | 63 | 64 |

Table 5 illustrates the various blends of benzaldehyde, vanillin, acetophenone, and Tergitol or Triton X-100 produced substantially similar results. Moreover, it was determined that these blends were effective at eliminating odors from the asphalt. In addition, it was concluded that the odor-reducing results obtained by these blends of aldehydes and ketones resulted in a similar result to that obtained by utilizing vanillin alone. Accordingly, it was concluded that the ketones had a slight effect on reducing the odors in the blend of compounds.

Example 5

Various Odor Reducing Compositions

The components set forth in Table 6 were mixed in a conventional mixing device to form the exemplary odor-reducing compositions 1-9. Compositions 1-9 and Competitor Sample D, the closest competitor odor reducing product, were then separately added to molten asphalt. Once the odor-reducing composition was added to the molten asphalt, the asphalt was stirred to incorporate the composition into the asphalt and produce asphalt samples. The samples were then tested using headspace gas chromatography as set forth above. Samples 1 and 2 are competitive examples.

TABLE 6

Odor-Reducing Compositions

| | 1 % by wt. | 2 % by wt. | 3 % by wt. | 4 % by wt. | 5 % by wt. | 6 % by wt. | 7 % by wt. | 8 % by wt. | 9 % by wt. | Competitor Sample D % by wt. |
|---|---|---|---|---|---|---|---|---|---|---|
| Benzaldehyde | 27 | 23 | | | | | | | | 27 |
| Cinnamaldehyde | | | | | | 7.5 | 10 | 2.5 | | |
| Vanillin | 1 | 5 | 15 | 5 | 25 | 7.5 | 20 | 2.5 | 10 | 0.4 |
| Acetophenone | 2 | 2 | | | | 7.5 | | 12.5 | | 0.9 |
| Benzophenone | | | 15 | 25 | 5 | 7.5 | | 12.5 | | |
| Tergitol NP-4 | 70 | 70 | 70 | 70 | 70 | 70 | 70 | 70 | 90 | |
| Amyl Butyrate | | | | | | | | | | 0.9 |
| Benzyl Acetate | | | | | | | | | | 3.6 |
| Methyl Salicylate | | | | | | | | | | 0.2 |
| Methyl Anthranilate | | | | | | | | | | 2.8 |
| Soy Methyl Ester | | | | | | | | | | 65.9 |
| Average % Odor Reduction | 53.5 | 51.1 | 52.8 | 50.2 | 56.0 | 55.5 | 58.5 | 50.2 | 58.8 | 19.9 |

(a) carrier solution - nonylphenol polyethylene glycol (available commercially from Witco Corp.)

As shown in the Table 6, the various inventive compositions significantly reduced the odors emitted from the molten asphalt. Thus, the inventive compositions 3-9 performed at least as well as the competitive samples 1 and 2.

Example 6

Testing Compositions on Asphalt at Various Temperatures

Compositions were formed using the most promising aldehyde-containing and ketone-containing compounds as determined by Examples 1-5. These compositions were tested to determine their odor-reducing potential in Type III and Type IV Asphalt at temperature conditions of 230° C. and 270° C. using headspace gas chromatography as set forth above. The results are set forth in Tables 7-18. In the tables, 3 k is a 3000:1 treatment level, 6 k is a 6000:1 treatment level, and 12 k is a 12000:1 treatment level. The components for competitor sample D is set forth in Table 7A.

TABLE 7A

Competitor Sample D Components

| Competitor Sample D | % by wt. |
|---|---|
| Benzaldehyde | 27 |
| Cinnamaldehyde | |
| Vanillin | 0.4 |
| Acetophenone | 0.9 |
| Benzophenone | |
| Tergitol NP-4 | |
| Amyl Butyrate | 0.9 |
| Benzyl Acetate | 3.6 |
| Methyl Salicylate | 0.2 |
| Methyl Anthranilate | 2.8 |
| Soy Methyl Ester | 65.9 |

TABLE 7

| Components | % by wt. | % by wt. | % by wt. | % by wt. | % by wt. | % by wt. | % by wt. | % by wt. | % by wt. | % by wt. |
|---|---|---|---|---|---|---|---|---|---|---|
| Competitor Sample D | 100 | | | | | | | | | |
| Benzaldehyde | | | 27 | | | | 23 | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE III | TYPE III | TYPE III | TYPE III | TYPE III | TYPE III | TYPE III | TYPE III | TYPE III | TYPE III |
| Temp. | 270° C. | 270° C. | 270° C. | 270° C. | 270° C. | 270° C. | 270° C. | 270° C. | 270° C. | 270° C. |
| Treatment Level | 3k | 3k | 3k | 3k | 3k | 3k | 3k | 3k | 3k | 3k |

| | % rd'n | % rd'n | % rd'n | % rd'n | % rd'n | % rd'n | % rd'n | % rd'n | % rd'n | % rd'n |
|---|---|---|---|---|---|---|---|---|---|---|
| hydrogen sulfide | 13.6 | 29.8 | 34.9 | 39.0 | 39.3 | 37.3 | 42.4 | 37.1 | 34.1 | 35.4 |
| butane thiol | 18.1 | 41.1 | 47.6 | 48.5 | 29.1 | 28.3 | 39.5 | 38.0 | 31.9 | 28.5 |
| thiophene | 23.1 | 40.9 | 46.0 | 44.9 | 38.5 | 41.8 | 46.5 | 41.2 | 37.7 | 43.4 |
| 2-methyl thiophene | 27.9 | 60.8 | 62.1 | 62.5 | 65.8 | 63.1 | 65.5 | 58.3 | 60.8 | 63.8 |
| ethyl thiophene | 19.6 | 56.7 | 63.8 | 64.3 | 63.8 | 58.9 | 60.6 | 56.5 | 56.2 | 57.5 |
| pentane thiol | 38.2 | 66.1 | 67.3 | 67.9 | 69.7 | 66.7 | 69.7 | 66.1 | 62.4 | 69.7 |
| hexane thiol | 36.4 | 62.4 | 65.9 | 63.6 | 63.6 | 59.5 | 64.7 | 60.7 | 61.3 | 61.3 |

TABLE 7-continued

| | | | | | | | | | |
|---|---|---|---|---|---|---|---|---|---|
| dimethyl disulfide | 33.0 | 61.9 | 67.6 | 69.2 | 64.1 | 63.8 | 66.7 | 59.9 | 62.5 | 68.6 |
| dibenzothiophene | 31.9 | 63.2 | 61.5 | 65.1 | 61.5 | 63.2 | 64.5 | 56.9 | 57.9 | 62.5 |
| butyl dibenzothiophene | 31.9 | 63.2 | 66.0 | 67.4 | 63.9 | 62.5 | 63.9 | 59.0 | 58.3 | 61.1 |
| benzene thiol | 9.8 | 41.8 | 45.9 | 47.5 | 45.9 | 45.1 | 51.6 | 43.4 | 41.0 | 45.1 |
| methylbenzenethiol | −4.8 | 43.3 | 39.0 | 40.6 | 43.3 | 42.2 | 39.6 | 35.3 | 36.4 | 42.2 |
| o-cresol | 32.0 | 70.1 | 67.7 | 67.1 | 60.4 | 60.1 | 72.2 | 70.3 | 71.9 | 73.0 |
| p-cresol | 53.2 | 69.0 | 74.4 | 75.7 | 69.4 | 67.6 | 75.8 | 75.1 | 74.9 | 76.9 |
| phenol | 63.3 | 71.0 | 73.6 | 73.7 | 73.9 | 73.4 | 74.9 | 72.8 | 74.5 | 76.6 |
| decene | 19.3 | 47.6 | 60.0 | 54.3 | 55.7 | 53.0 | 60.6 | 49.0 | 54.9 | 59.4 |
| quinoline | 58.3 | 71.9 | 74.2 | 73.4 | 75.3 | 73.6 | 75.4 | 73.1 | 73.7 | 76.6 |
| Average % Odor Reduction | 29.7 | 56.5 | 59.9 | 60.3 | 57.8 | 56.5 | 60.8 | 56.0 | 55.9 | 58.9 |

TABLE 8

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE III | TYPE III | TYPE III | TYPE III | TYPE III | TYPE III | TYPE III | TYPE III | TYPE III | TYPE III |
| Temp. | 270° C. | 270° C. | 270° C. | 270° C. | 270° C. | 270° C. | 270° C. | 270° C. | 270° C. | 270° C. |
| Treatment Level | 6k | 6k | 6k | 6k | 6k | 6k | 6k | 6k | 6k | 6k |
| | % rd'n | % rd'n | % rd'n | % rd'n | % rd'n | % rd'n | % rd'n | % rd'n | % rd'n | % rd'n |
| hydrogen sulfide | 13.2 | 24.9 | 26.3 | 29.4 | 43.6 | 30.4 | 33.9 | 32.3 | 30.7 | 22.1 |
| butane thiol | 16.6 | 44.1 | 53.8 | 50.0 | 57.4 | 28.6 | 38.7 | 37.2 | 28.6 | 28.5 |
| thiophene | 14.4 | 41.5 | 41.8 | 40.2 | 53.0 | 36.9 | 49.5 | 37.5 | 30.4 | 42.0 |
| 2-methyl thiophene | 17.9 | 50.3 | 59.1 | 53.8 | 79.2 | 55.0 | 61.0 | 52.7 | 50.6 | 56.4 |
| ethyl thiophene | 22.7 | 57.7 | 67.0 | 66.3 | 75.6 | 64.3 | 65.0 | 58.4 | 60.4 | 63.8 |
| pentane thiol | 33.9 | 63.6 | 67.9 | 68.5 | 80.0 | 64.2 | 69.7 | 64.2 | 60.6 | 69.7 |
| hexane thiol | 35.3 | 64.2 | 67.6 | 65.3 | 72.8 | 58.4 | 66.5 | 61.8 | 62.4 | 61.3 |
| dimethyl disulfide | 25.6 | 61.2 | 69.2 | 70.5 | 76.6 | 63.1 | 66.7 | 65.8 | 59.3 | 66.3 |
| dibenzothiophene | 27.0 | 64.5 | 63.2 | 65.8 | 73.0 | 62.8 | 62.5 | 58.6 | 58.9 | 62.5 |
| butyl dibenzothiophene | 52.1 | 66.0 | 68.8 | 69.4 | 75.0 | 61.1 | 70.1 | 59.7 | 60.4 | 67.4 |
| benzene thiol | 55.7 | 54.9 | 54.1 | 52.5 | 73.8 | 53.3 | 61.5 | 54.9 | 49.2 | 61.5 |
| methylbenzenethiol | −9.6 | 40.6 | 43.3 | 43.3 | 61.5 | 39.6 | 43.9 | 41.7 | 35.8 | 43.3 |
| o-cresol | 39.6 | 69.4 | 67.3 | 66.7 | 72.5 | 61.5 | 73.2 | 70.1 | 70.8 | 71.7 |
| p-cresol | 37.1 | 70.9 | 74.2 | 72.4 | 79.9 | 68.3 | 76.2 | 75.1 | 74.8 | 78.0 |
| phenol | 52.7 | 64.5 | 73.2 | 70.7 | 84.0 | 71.2 | 71.8 | 70.0 | 71.5 | 75.2 |
| decene | 15.9 | 47.8 | 57.3 | 53.6 | 71.0 | 52.8 | 60.6 | 53.1 | 51.6 | 57.6 |
| quinoline | 56.8 | 66.9 | 74.1 | 70.7 | 83.1 | 70.6 | 72.6 | 71.0 | 67.4 | 76.9 |
| Average % Odor Reduction | 29.8 | 56.1 | 60.5 | 59.4 | 71.3 | 55.4 | 61.4 | 56.3 | 54.3 | 59.1 |

TABLE 9

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE III | TYPE III | TYPE III | TYPE III | TYPE III | TYPE III | TYPE III | TYPE III | TYPE III | TYPE III |

TABLE 9-continued

| Temp. Treat Level | 270° C. 12k | 270° C. 12k | 270° C. 12k | 270° C. 12k | 270° C. 12k | 270° C. 12k | 270° C. 12k | 270° C. 12k | 270° C. 12k | 270° C. 12k |
|---|---|---|---|---|---|---|---|---|---|---|
| % rd'n | % rd'n | % rd'n | % rd'n | % rd'n | % rd'n | % rd'n | % rd'n | % rd'n | % rd'n | % rd'n |
| hydrogen sulfide | 15.2 | 21.6 | 19.7 | 30.1 | 33.2 | 30.8 | 40.2 | 31.9 | 20.2 | 25.3 |
| butane thiol | 28 | 32.4 | 35.7 | 43.4 | 20.3 | 24.8 | 60.7 | 33.1 | 21.1 | 17.9 |
| thiophene | 23.4 | 27.7 | 32.5 | 40.1 | 32.2 | 35.3 | 55.6 | 28.7 | 30 | 34.5 |
| 2-methyl thiophene | 27.3 | 47.3 | 48.2 | 53.4 | 55.7 | 52.8 | 80.3 | 53 | 49.9 | 52.6 |
| ethyl thiophene | 29.8 | 50.1 | 51.3 | 60.9 | 59.4 | 53.1 | 75.6 | 51.3 | 52.1 | 55.7 |
| pentane thiol | 27.3 | 57 | 60 | 63.6 | 62.4 | 57 | 75.2 | 57.6 | 54.5 | 63 |
| hexane thiol | 28.3 | 56.1 | 60.7 | 59 | 57.8 | 51.4 | 72.3 | 51.4 | 57.2 | 56.1 |
| dimethyl disulfide | 26.6 | 54.5 | 56.4 | 61.2 | 56.1 | 56.7 | 76.6 | 51.9 | 52.2 | 59.3 |
| dibenzothiophene | 26 | 54.6 | 59.2 | 62.2 | 56.9 | 58.2 | 70.4 | 53.6 | 52.3 | 55.6 |
| butyl dibenzothiophene | 28.5 | 56.3 | 59.7 | 61.8 | 56.9 | 52.8 | 73.6 | 53.5 | 52.8 | 58.3 |
| benzene thiol | 27 | 37.7 | 36.1 | 45.9 | 46.7 | 41.8 | 71.3 | 36.1 | 32 | 41 |
| methylbenzenethiol | 25.1 | 21.9 | 28.9 | 37.4 | 36.4 | 33.7 | 55.6 | 26.2 | 24.6 | 33.7 |
| o-cresol | 29.7 | 66.6 | 65.4 | 62.8 | 55.1 | 57.4 | 79.4 | 66.4 | 65 | 68.9 |
| p-cresol | 23.4 | 68.9 | 69.2 | 71.7 | 65.4 | 64 | 81.7 | 71.6 | 71.6 | 76.5 |
| phenol | 32.3 | 62.4 | 62.3 | 68.5 | 67.5 | 67.1 | 83.2 | 66.2 | 69.2 | 71.4 |
| decene | 28.4 | 46.4 | 45.8 | 52.5 | 50 | 47.5 | 72.6 | 42.3 | 46.4 | 53.9 |
| quinoline | 35 | 65.9 | 63 | 69.2 | 68.5 | 69.5 | 81.2 | 66.1 | 65.3 | 71.8 |
| Average % Odor Reduction | 27.1 | 48.7 | 50.2 | 55.5 | 51.8 | 50.2 | 70.9 | 49.5 | 48.0 | 52.7 |

TABLE 10

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE III | TYPE III | TYPE III | TYPE III | TYPE III | TYPE III | TYPE III | TYPE III | TYPE III | TYPE III |
| Temp. Treatment Level | 230° C. 3k | 230° C. 3k | 230° C. 3k | 230° C. 3k | 230° C. 3k | 230° C. 3k | 230° C. 3k | 230° C. 3k | 230° C. 3k | 230° C. 3k |
| | % rd'n | % rd'n | % rd'n | % rd'n | % rd'n | % rd'n | % rd'n | % rd'n | % rd'n | % rd'n |
| hydrogen sulfide | 17.3 | 29.9 | 2.0 | 53.9 | 11.3 | 39.2 | 34.5 | 6.9 | 34.5 | 34.2 |
| butane thiol | 28.4 | 49.2 | 35.7 | 70.1 | 7.2 | 34.2 | 34.7 | 19.3 | 34.7 | 32.3 |
| thiophene | 17.0 | 40.0 | 22.4 | 63.5 | 17.2 | 39.8 | 39.8 | 15.5 | 39.8 | 41.5 |
| 2-methyl thiophene | 31.8 | 61.3 | 50.8 | 76.0 | 51.3 | 65.5 | 62.3 | 44.0 | 62.3 | 63.9 |
| ethyl thiophene | 18.8 | 58.8 | 46.9 | 71.8 | 44.5 | 61.2 | 57.1 | 36.7 | 57.1 | 59.6 |
| pentane thiol | 21.4 | 58.3 | 42.9 | 71.4 | 45.2 | 64.3 | 51.2 | 38.1 | 51.2 | 61.9 |
| hexane thiol | 22.3 | 61.2 | 43.7 | 70.9 | 38.8 | 54.4 | 54.4 | 32.0 | 54.4 | 58.3 |
| dimethyl disulfide | 18.1 | 57.9 | 49.1 | 74.9 | 43.9 | 61.4 | 54.4 | 35.7 | 54.4 | 64.9 |
| dibenzothiophene | 17.5 | 59.0 | 37.2 | 69.4 | 38.3 | 55.7 | 53.0 | 31.7 | 53.0 | 57.4 |
| butyl dibenzothiophene | 22.6 | 63.1 | 52.4 | 77.4 | 46.4 | 61.9 | 54.8 | 39.3 | 54.8 | 60.7 |
| benzene thiol | 33.3 | 60.2 | 48.4 | 73.1 | 51.6 | 67.7 | 62.4 | 46.2 | 62.4 | 67.7 |
| methylbenzenethiol | 25.3 | 54.9 | 37.7 | 71.0 | 40.7 | 58.0 | 56.2 | 35.2 | 56.2 | 61.1 |
| o-cresol | 16.5 | 68.8 | 54.1 | 75.4 | 44.9 | 62.0 | 70.1 | 57.0 | 70.1 | 70.6 |
| p-cresol | 20.3 | 67.7 | 60.9 | 81.4 | 53.9 | 65.6 | 73.4 | 61.8 | 73.4 | 77.2 |
| phenol | 27.0 | 66.2 | 62.5 | 79.0 | 61.1 | 70.7 | 70.8 | 59.2 | 70.8 | 75.3 |
| decene | 22.2 | 50.5 | 40.3 | 70.8 | 39.2 | 58.5 | 53.5 | 29.7 | 53.5 | 62.5 |
| quinoline | 30.8 | 68.0 | 60.8 | 80.1 | 58.1 | 69.4 | 67.0 | 56.5 | 67.0 | 72.4 |
| Average % Odor Reduction | 23.0 | 57.4 | 44.0 | 72.4 | 40.8 | 58.2 | 55.9 | 37.9 | 55.9 | 60.1 |

TABLE 11

| Components | | | | | |
|---|---|---|---|---|---|
| Competitor Sample D | 100 | | | | |
| Benzaldehyde | | | 27 | | 23 |
| Cinnamaldehyde | | | | 10 | 7.5 | 2.5 |

TABLE 11-continued

| | | | | | | | | | | |
|---|---|---|---|---|---|---|---|---|---|---|
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE III | TYPE III | TYPE III | TYPE III | TYPE III | TYPE III | TYPE III | TYPE III | TYPE III | TYPE III |
| Temp. | 230° C. | 230° C. | 230° C. | 230° C. | 230° C. | 230° C. | 230° C. | 230° C. | 230° C. | 230° C. |
| Treatment Level | 6k | 6k | 6k | 6k | 6k | 6k | 6k | 6k | 6k | 6k |
| | % rd'n | % rd'n | % rd'n | % rd'n | % rd'n | % rd'n | % rd'n | % rd'n | % rd'n | % rd'n |
| hydrogen sulfide | 16.3 | 24.8 | 31.5 | 33.0 | 35.0 | 33.7 | 10.3 | 31.2 | 0.0 | 32.4 |
| butane thiol | 20.0 | 44.3 | 47.0 | 45.8 | 27.7 | 25.1 | 15.2 | 36.6 | 2.9 | 28.2 |
| thiophene | 13.8 | 38.8 | 37.1 | 41.3 | 36.3 | 34.6 | 22.6 | 38.4 | 6.1 | 44.0 |
| 2-methyl thiophene | 27.9 | 61.0 | 61.2 | 61.0 | 63.0 | 64.2 | 51.1 | 56.8 | 43.2 | 63.7 |
| ethyl thiophene | 13.1 | 52.2 | 58.8 | 58.8 | 55.9 | 55.1 | 40.8 | 51.4 | 32.7 | 55.5 |
| pentane thiol | 16.7 | 50.0 | 56.0 | 57.1 | 57.1 | 50.0 | 36.9 | 51.2 | 25.0 | 56.0 |
| hexane thiol | 12.6 | 49.5 | 52.4 | 50.5 | 50.5 | 44.7 | 32.0 | 46.6 | 26.2 | 51.5 |
| dimethyl disulfide | 9.9 | 53.8 | 62.0 | 59.1 | 52.0 | 53.2 | 38.6 | 49.1 | 27.5 | 53.8 |
| dibenzothiophene | 2.7 | 49.7 | 48.1 | 53.6 | 47.5 | 50.3 | 34.4 | 38.8 | 23.5 | 50.3 |
| butyl dibenzothiophene | 11.9 | 51.2 | 56.0 | 57.1 | 51.2 | 51.2 | 39.3 | 44.0 | 27.4 | 50.0 |
| benzene thiol | 21.5 | 54.8 | 57.0 | 60.2 | 60.2 | 57.0 | 45.2 | 54.8 | 34.4 | 62.4 |
| methylbenzenethiol | 17.3 | 47.5 | 53.1 | 52.5 | 52.5 | 52.5 | 32.1 | 46.3 | 24.7 | 56.2 |
| o-cresol | 11.8 | 66.1 | 64.9 | 64.2 | 55.4 | 55.2 | 56.3 | 66.5 | 55.1 | 69.0 |
| p-cresol | 17.1 | 65.6 | 70.0 | 70.9 | 67.5 | 61.1 | 59.6 | 70.2 | 58.2 | 74.0 |
| phenol | 19.0 | 62.9 | 69.8 | 71.4 | 69.7 | 69.6 | 59.4 | 66.0 | 58.7 | 70.7 |
| decene | 15.3 | 43.2 | 54.5 | 51.7 | 54.0 | 56.1 | 39.4 | 48.6 | 25.2 | 54.5 |
| quinoline | 26.6 | 63.3 | 69.8 | 65.8 | 67.9 | 65.5 | 55.2 | 59.9 | 51.2 | 68.0 |
| Average % Odor Reduction | 16.1 | 51.7 | 55.8 | 56.1 | 53.1 | 51.7 | 39.3 | 50.4 | 30.7 | 55.3 |

TABLE 12

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | 5 | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE III | TYPE III | TYPE III | TYPE III | TYPE III | TYPE III | TYPE III | TYPE III | TYPE III | TYPE III |
| Temp. | 230° C. | 230° C. | 230° C. | 230° C. | 230° C. | 230° C. | 230° C. | 230° C. | 230° C. | 230° C. |
| Treatment Level | 12k | 12k | 12k | 12k | 12k | 12k | 12k | 12k | 12k | 12k |
| | % rd'n | % rd'n | % rd'n | % rd'n | % rd'n | % rd'n | % rd'n | % rd'n | % rd'n | % rd'n |
| hydrogen sulfide | 13.7 | 6.4 | −9.2 | 24.0 | 31.5 | 10.1 | 28.6 | 2.0 | 22.4 | 20.4 |
| butane thiol | 12.8 | 53.0 | 21.2 | 42.4 | 14.5 | 1.0 | 19.8 | 0.2 | 15.2 | 11.8 |
| thiophene | 7.3 | 46.5 | 12.2 | 44.4 | 26.4 | 3.1 | 30.0 | −4.0 | 20.8 | 30.2 |
| 2-methyl thiophene | 22.5 | 59.1 | 42.2 | 58.0 | 57.3 | 40.7 | 58.4 | 35.4 | 57.4 | 60.0 |
| ethyl thiophene | 3.7 | 58.0 | 36.3 | 55.9 | 49.8 | 28.6 | 52.7 | 22.9 | 45.3 | 48.2 |
| pentane thiol | 9.5 | 42.9 | 29.8 | 52.4 | 51.2 | 19.0 | 46.4 | 22.6 | 42.9 | 57.1 |
| hexane thiol | 5.8 | 42.7 | 27.2 | 48.5 | 45.6 | 10.7 | 37.9 | 11.7 | 41.7 | 43.7 |
| dimethyl disulfide | 9.9 | 44.4 | 39.2 | 58.5 | 50.3 | 24.0 | 46.2 | 18.1 | 45.6 | 52.0 |
| dibenzothiophene | 4.4 | 57.4 | 21.3 | 45.4 | 46.4 | 22.4 | 45.4 | 11.5 | 38.8 | 44.3 |
| butyl dibenzothiophene | 8.3 | 40.5 | 34.5 | 51.2 | 45.2 | 25.0 | 46.4 | 17.9 | 44.0 | 46.4 |
| benzene thiol | 26.9 | 55.9 | 31.2 | 52.7 | 57.0 | 31.2 | 51.6 | 29.0 | 51.6 | 53.8 |
| methylbenzenethiol | 1.2 | 53.1 | 20.4 | 43.2 | 47.5 | 22.2 | 40.7 | 14.8 | 43.2 | 45.7 |
| o-cresol | 5.5 | 68.4 | 46.8 | 62.6 | 51.1 | 32.3 | 54.5 | 47.9 | 63.2 | 65.3 |
| p-cresol | 13.3 | 53.7 | 53.5 | 66.0 | 60.8 | 41.9 | 60.0 | 52.1 | 65.7 | 72.2 |
| phenol | 21.2 | 62.0 | 54.1 | 66.8 | 66.2 | 50.4 | 64.7 | 49.4 | 68.1 | 68.9 |
| decene | 3.8 | −33.5 | 24.8 | 46.7 | 45.8 | 19.3 | 43.2 | 13.2 | 44.6 | 50.9 |
| quinoline | 17.0 | 66.4 | 52.6 | 66.7 | 64.6 | 44.0 | 58.8 | 45.1 | 62.3 | 69.3 |
| Average % Odor Reduction | 11.0 | 45.7 | 31.7 | 52.1 | 47.7 | 25.1 | 46.2 | 22.9 | 45.5 | 49.4 |

TABLE 13

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE IV | TYPE IV | TYPE IV | TYPE IV | TYPE IV | TYPE IV | TYPE IV | TYPE IV | TYPE IV | TYPE IV |
| Temp. | 270° C. | 270° C. | 270° C. | 270° C. | 270° C. | 270° C. | 270° C. | 270° C. | 270° C. | 270° C. |
| Treatment Level | 3k | 3k | 3k | 3k | 3k | 3k | 3k | 3k | 3k | 3k |
| | % rd'n | % rd'n | % rd'n | % rd'n | % rd'n | % rd'n | % rd'n | % rd'n | % rd'n | % rd'n |
| hydrogen sulfide | 20.6 | 28.9 | 34.3 | 36.9 | 40.1 | 39.0 | 42.6 | 37.7 | 35.8 | 33.3 |
| butane thiol | 18.9 | 45.4 | 49.7 | 49.4 | 29.2 | 29.8 | 40.8 | 38.8 | 33.0 | 30.1 |
| thiophene | 21.6 | 43.8 | 46.6 | 45.2 | 40.7 | 42.1 | 48.7 | 41.0 | 37.4 | 44.2 |
| 2-methyl thiophene | 30.7 | 60.4 | 63.6 | 64.0 | 65.2 | 63.9 | 66.8 | 60.0 | 60.6 | 63.9 |
| ethyl thiophene | 18.1 | 56.0 | 62.3 | 62.9 | 61.1 | 57.8 | 60.9 | 55.6 | 56.5 | 57.8 |
| pentane thiol | 39.1 | 64.4 | 67.1 | 68.4 | 68.9 | 65.3 | 68.9 | 65.3 | 63.1 | 69.3 |
| hexane thiol | 33.6 | 64.8 | 64.8 | 63.9 | 63.1 | 59.0 | 65.6 | 59.4 | 62.3 | 62.3 |
| dimethyl disulfide | 32.9 | 64.6 | 70.3 | 70.1 | 66.2 | 64.9 | 68.9 | 62.8 | 63.7 | 68.7 |
| dibenzothiophene | 30.7 | 64.8 | 65.0 | 67.0 | 65.0 | 64.3 | 67.0 | 61.0 | 61.2 | 65.2 |
| butyl dibenzothiophene | 33.3 | 64.1 | 66.7 | 68.2 | 64.1 | 62.6 | 65.2 | 58.6 | 58.6 | 63.6 |
| benzene thiol | 5.5 | 41.1 | 43.6 | 47.9 | 47.2 | 44.8 | 52.1 | 42.3 | 41.1 | 48.5 |
| methylbenzenethiol | −1.5 | 42.7 | 41.6 | 46.7 | 46.0 | 42.7 | 44.9 | 39.1 | 38.3 | 45.3 |
| o-cresol | 12.5 | 68.1 | 66.7 | 66.5 | 59.4 | 58.4 | 71.3 | 68.7 | 70.1 | 71.2 |
| p-cresol | 30.6 | 72.2 | 75.8 | 76.6 | 71.7 | 70.1 | 77.1 | 76.3 | 76.7 | 79.6 |
| phenol | 34.9 | 69.6 | 73.9 | 74.1 | 73.1 | 72.8 | 75.3 | 72.0 | 74.7 | 76.9 |
| decene | 20.9 | 48.3 | 58.8 | 56.3 | 57.1 | 55.0 | 62.5 | 50.8 | 52.5 | 59.6 |
| quinoline | 39.6 | 69.7 | 75.3 | 72.7 | 74.1 | 72.6 | 74.4 | 71.9 | 72.3 | 76.2 |
| Average % Odor Reduction | 24.8 | 57.0 | 60.4 | 61.0 | 58.4 | 56.8 | 61.9 | 56.5 | 56.3 | 59.7 |

TABLE 14

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE IV | TYPE IV | TYPE IV | TYPE IV | TYPE IV | TYPE IV | TYPE IV | TYPE IV | TYPE IV | TYPE IV |
| Temp. | 270° C. | 270° C. | 270° C. | 270° C. | 270° C. | 270° C. | 270° C. | 270° C. | 270° C. | 270° C. |
| Treatment Level | 6k | 6k | 6k | 6k | 6k | 6k | 6k | 6k | 6k | 6k |
| | % rd'n | % rd'n | % rd'n | % rd'n | % rd'n | % rd'n | % rd'n | % rd'n | % rd'n | % rd'n |
| hydrogen sulfide | 14.5 | 23.1 | 28.8 | 32.0 | 44.5 | 32.6 | 35.6 | 33.4 | 30.0 | 27.4 |
| butane thiol | 18.3 | 45.7 | 50.6 | 49.4 | 57.6 | 30.7 | 41.1 | 38.0 | 31.4 | 29.0 |
| thiophene | 15.7 | 40.8 | 43.3 | 42.3 | 53.6 | 39.3 | 47.3 | 37.8 | 34.7 | 40.3 |
| 2-methyl thiophene | 19.3 | 53.5 | 58.8 | 56.7 | 79.4 | 57.0 | 60.9 | 52.0 | 53.4 | 58.1 |
| ethyl thiophene | 21.6 | 57.8 | 64.9 | 65.8 | 75.4 | 60.5 | 64.5 | 59.4 | 59.8 | 60.5 |
| pentane thiol | 34.2 | 63.6 | 66.2 | 67.6 | 79.6 | 63.6 | 68.4 | 63.6 | 60.9 | 69.3 |
| hexane thiol | 37.7 | 66.4 | 67.6 | 66.0 | 74.2 | 60.7 | 66.4 | 61.1 | 63.5 | 63.9 |
| dimethyl disulfide | 29.7 | 62.8 | 68.9 | 69.6 | 78.2 | 64.2 | 67.3 | 60.8 | 60.1 | 68.3 |
| dibenzothiophene | 31.2 | 66.6 | 65.0 | 67.9 | 74.7 | 65.2 | 67.3 | 61.4 | 62.6 | 66.4 |
| butyl dibenzothiophene | 33.8 | 66.7 | 70.2 | 70.7 | 77.3 | 63.1 | 69.7 | 62.1 | 61.6 | 67.2 |
| benzene thiol | 17.8 | 49.7 | 54.0 | 54.6 | 72.4 | 55.2 | 60.7 | 52.1 | 49.1 | 60.1 |
| methylbenzenethiol | 1.5 | 43.1 | 44.9 | 48.5 | 65.0 | 44.5 | 47.8 | 42.3 | 40.1 | 46.4 |
| o-cresol | 11.1 | 68.1 | 66.0 | 66.6 | 72.3 | 58.8 | 70.4 | 68.3 | 69.2 | 71.0 |
| p-cresol | 31.4 | 71.8 | 75.1 | 75.8 | 80.5 | 70.1 | 76.9 | 76.0 | 76.1 | 79.5 |
| phenol | 23.7 | 65.5 | 72.0 | 71.0 | 83.5 | 69.7 | 72.1 | 69.5 | 71.0 | 73.8 |

TABLE 14-continued

| | | | | | | | | | |
|---|---|---|---|---|---|---|---|---|---|
| decene | 21.0 | 48.5 | 58.4 | 55.8 | 72.9 | 55.4 | 61.0 | 50.9 | 52.9 | 59.1 |
| quinoline | 33.5 | 66.7 | 72.7 | 69.9 | 82.8 | 69.7 | 71.9 | 70.2 | 68.8 | 73.4 |
| Average % Odor Reduction | 23.3 | 56.5 | 60.4 | 60.6 | 72.0 | 56.5 | 61.7 | 56.4 | 55.6 | 59.6 |

TABLE 15

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE IV | TYPE IV | TYPE IV | TYPE IV | TYPE IV | TYPE IV | TYPE IV | TYPE IV | TYPE IV | TYPE IV |
| Temp. | 270° C. | 270° C. | 270° C. | 270° C. | 270° C. | 270° C. | 270° C. | 270° C. | 270° C. | 270° C. |
| Treatment Level | 12k | 12k | 12k | 12k | 12k | 12k | 12k | 12k | 12k | 12k |
| | % rd'n | % rd'n | % rd'n | % rd'n | % rd'n | % rd'n | % rd'n | % rd'n | % rd'n | % rd'n |
| hydrogen sulfide | 11.7 | 22.0 | 21.8 | 29.8 | 34.9 | 32.2 | 43.6 | 33.9 | 24.7 | 22.2 |
| butane thiol | -2.4 | 32.9 | 39.2 | 46.4 | 20.2 | 22.7 | 61.5 | 54.5 | 20.7 | 19.9 |
| thiophene | -1.9 | 29.1 | 35.8 | 39.6 | 33.2 | 36.9 | 56.7 | 41.8 | 30.0 | 36.6 |
| 2-methyl thiophene | 14.6 | 48.2 | 49.1 | 54.6 | 55.3 | 53.9 | 79.5 | 72.7 | 51.2 | 57.1 |
| ethyl thiophene | 11.6 | 52.0 | 50.5 | 59.1 | 55.8 | 53.6 | 73.7 | 65.8 | 49.6 | 53.8 |
| pentane thiol | 19.1 | 54.7 | 59.1 | 63.1 | 63.1 | 56.9 | 76.4 | 71.1 | 54.2 | 63.6 |
| hexane thiol | 19.7 | 57.4 | 61.1 | 58.6 | 59.8 | 54.5 | 71.7 | 62.7 | 56.6 | 55.7 |
| dimethyl disulfide | 10.9 | 55.1 | 59.2 | 64.2 | 59.2 | 58.3 | 76.4 | 68.3 | 56.5 | 61.7 |
| dibenzothiophene | 15.9 | 57.4 | 61.2 | 63.7 | 60.3 | 60.8 | 73.3 | 63.7 | 56.1 | 61.2 |
| butyl dibenzothiophene | 16.7 | 55.6 | 60.1 | 65.2 | 59.6 | 57.6 | 74.2 | 65.2 | 55.1 | 59.1 |
| benzene thiol | -4.9 | 34.4 | 35.6 | 43.6 | 42.9 | 38.7 | 69.3 | 59.5 | 34.4 | 40.5 |
| methylbenzenethiol | -31.8 | 26.6 | 33.9 | 40.5 | 39.8 | 35.4 | 59.9 | 49.6 | 30.3 | 35.8 |
| o-cresol | 3.8 | 64.8 | 65.0 | 61.2 | 54.3 | 54.6 | 78.4 | 73.8 | 65.1 | 66.9 |
| p-cresol | 23.9 | 70.1 | 69.9 | 73.5 | 68.6 | 67.1 | 82.9 | 79.7 | 73.2 | 76.7 |
| phenol | 18.6 | 63.1 | 62.4 | 68.1 | 66.9 | 65.8 | 82.9 | 78.5 | 68.0 | 70.4 |
| decene | 9.2 | 47.1 | 47.7 | 53.0 | 52.2 | 48.3 | 73.4 | 61.3 | 46.8 | 51.4 |
| quinoline | 26.4 | 64.1 | 63.7 | 67.0 | 68.4 | 65.0 | 81.4 | 77.5 | 65.3 | 69.4 |
| Average % Odor Reduction | 9.5 | 49.1 | 51.5 | 56.0 | 52.6 | 50.7 | 71.5 | 63.5 | 49.3 | 53.1 |

TABLE 16

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE IV | TYPE IV | TYPE IV | TYPE IV | TYPE IV | TYPE IV | TYPE IV | TYPE IV | TYPE IV | TYPE IV |
| Temp. | 230° C. | 230° C. | 230° C. | 230° C. | 230° C. | 230° C. | 230° C. | 230° C. | 230° C. | 230° C. |
| Treatment Level | 3k | 3k | 3k | 3k | 3k | 3k | 3k | 3k | 3k | 3k |
| | % rd'n | % rd'n | % rd'n | % rd'n | % rd'n | % rd'n | % rd'n | % rd'n | % rd'n | % rd'n |
| hydrogen sulfide | 17.6 | 25.6 | 31.4 | 34.0 | 37.9 | 34.7 | 38.2 | 34.8 | 31.4 | 29.9 |
| butane thiol | 23.3 | 49.3 | 54.0 | 52.9 | 33.6 | 35.7 | 45.0 | 42.2 | 36.2 | 34.1 |
| thiophene | 19.4 | 43.6 | 45.1 | 44.8 | 41.4 | 41.1 | 48.4 | 40.2 | 37.2 | 43.2 |
| 2-methyl thiophene | 27.4 | 58.1 | 62.9 | 61.5 | 63.3 | 61.9 | 64.9 | 57.8 | 58.7 | 62.4 |
| ethyl thiophene | 15.9 | 55.7 | 63.1 | 63.4 | 61.4 | 58.2 | 62.2 | 56.0 | 57.1 | 58.2 |
| pentane thiol | 22.1 | 56.6 | 60.7 | 61.5 | 62.3 | 57.4 | 63.1 | 57.4 | 54.9 | 63.9 |
| hexane thiol | 27.7 | 61.3 | 62.6 | 61.3 | 59.4 | 54.8 | 61.3 | 54.8 | 58.1 | 58.7 |

TABLE 16-continued

| | | | | | | | | | |
|---|---|---|---|---|---|---|---|---|---|
| dimethyl disulfide | 20.6 | 57.7 | 64.9 | 65.3 | 61.3 | 59.3 | 63.3 | 55.6 | 55.2 | 64.1 |
| dibenzothiophene | 18.0 | 59.6 | 57.7 | 61.4 | 58.5 | 58.1 | 61.0 | 54.0 | 54.4 | 59.6 |
| butyl dibenzothiophene | 19.1 | 60.0 | 63.6 | 64.5 | 59.1 | 54.5 | 62.7 | 53.6 | 53.6 | 59.1 |
| benzene thiol | 30.9 | 58.5 | 61.0 | 62.6 | 63.4 | 61.8 | 66.7 | 59.3 | 56.9 | 66.7 |
| methylbenzenethiol | 25.7 | 56.5 | 57.4 | 60.8 | 59.5 | 58.2 | 59.5 | 55.7 | 54.4 | 59.1 |
| o-cresol | 17.6 | 70.0 | 68.4 | 68.5 | 62.0 | 61.6 | 72.5 | 70.4 | 71.6 | 72.8 |
| p-cresol | 23.4 | 68.9 | 72.9 | 73.4 | 68.1 | 66.7 | 74.4 | 73.6 | 73.7 | 77.2 |
| phenol | 28.0 | 66.9 | 72.8 | 72.1 | 71.8 | 70.9 | 73.1 | 70.5 | 72.5 | 75.1 |
| decene | 21.8 | 50.1 | 59.1 | 57.2 | 58.3 | 56.7 | 62.8 | 51.9 | 54.0 | 60.6 |
| quinoline | 28.5 | 64.4 | 71.1 | 67.9 | 69.1 | 67.3 | 69.9 | 67.9 | 66.6 | 71.4 |
| Average % Odor Reduction | 22.8 | 56.6 | 60.5 | 60.8 | 58.3 | 56.4 | 61.7 | 56.2 | 55.7 | 59.8 |

TABLE 17

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE IV | TYPE IV | TYPE IV | TYPE IV | TYPE IV | TYPE IV | TYPE IV | TYPE IV | TYPE IV | TYPE IV |
| Temp. | 230° C. | 230° C. | 230° C. | 230° C. | 230° C. | 230° C. | 230° C. | 230° C. | 230° C. | 230° C. |
| Treatment Level | 6k | 6k | 6k | 6k | 6k | 6k | 6k | 6k | 6k | 6k |
| | % rd'n | % rd'n | % rd'n | % rd'n | % rd'n | % rd'n | % rd'n | % rd'n | % rd'n | % rd'n |
| hydrogen sulfide | 16.1 | 24.3 | 30.1 | 33.0 | 36.8 | 33.4 | 37.2 | 33.5 | 30.0 | 27.1 |
| butane thiol | 15.5 | 44.0 | 48.8 | 47.8 | 26.9 | 29.1 | 39.3 | 36.6 | 30.5 | 29.1 |
| thiophene | 15.3 | 40.2 | 42.0 | 42.0 | 38.0 | 37.8 | 45.3 | 36.9 | 33.5 | 39.9 |
| 2-methyl thiophene | 24.2 | 56.0 | 61.1 | 59.5 | 61.5 | 60.1 | 63.2 | 55.8 | 57.2 | 61.1 |
| ethyl thiophene | 11.1 | 52.6 | 59.9 | 60.5 | 58.2 | 55.1 | 58.8 | 52.6 | 53.1 | 55.1 |
| pentane thiol | 15.6 | 50.0 | 54.1 | 55.7 | 55.7 | 51.6 | 56.6 | 51.6 | 48.4 | 56.6 |
| hexane thiol | 17.4 | 54.2 | 55.5 | 54.2 | 52.9 | 47.7 | 54.8 | 47.7 | 51.0 | 52.3 |
| dimethyl disulfide | 11.3 | 52.4 | 59.7 | 59.7 | 55.6 | 53.2 | 57.7 | 49.6 | 50.0 | 57.7 |
| dibenzothiophene | 8.8 | 53.3 | 52.6 | 56.3 | 52.9 | 52.6 | 55.9 | 47.4 | 48.5 | 54.4 |
| butyl dibenzothiophene | 7.3 | 50.9 | 54.5 | 55.5 | 50.0 | 48.2 | 53.6 | 43.6 | 44.5 | 50.9 |
| benzene thiol | 20.3 | 50.4 | 52.0 | 55.3 | 55.3 | 53.7 | 58.5 | 52.0 | 50.4 | 56.9 |
| methylbenzenethiol | 16.9 | 50.6 | 51.9 | 54.9 | 54.0 | 51.5 | 53.6 | 48.9 | 48.5 | 55.3 |
| o-cresol | 10.1 | 67.2 | 65.4 | 65.5 | 58.4 | 58.1 | 69.9 | 67.5 | 69.0 | 70.6 |
| p-cresol | 16.4 | 65.9 | 70.3 | 70.9 | 65.1 | 63.6 | 72.0 | 71.1 | 71.0 | 75.1 |
| phenol | 21.6 | 63.9 | 70.3 | 69.5 | 69.2 | 68.2 | 70.6 | 67.4 | 70.1 | 72.8 |
| decene | 14.4 | 44.7 | 54.9 | 53.0 | 53.8 | 51.9 | 58.5 | 47.2 | 48.8 | 55.7 |
| quinoline | 22.1 | 61.0 | 67.9 | 64.4 | 66.2 | 64.3 | 67.0 | 64.0 | 64.1 | 68.6 |
| Average % Odor Reduction | 15.6 | 51.9 | 55.9 | 56.3 | 53.6 | 51.8 | 57.2 | 51.4 | 51.1 | 55.2 |

TABLE 18

| Components | | | | | | | | | | |
|---|---|---|---|---|---|---|---|---|---|---|
| Competitor Sample D | 100 | | | | | | | | | |
| Benzaldehyde | | | 27 | | | 23 | | | | |
| Cinnamaldehyde | | | | 10 | 7.5 | | | 2.5 | | |
| Vanillin | | 15 | 1 | 20 | 7.5 | 5 | 10 | 2.5 | 5 | 25 |
| Acetophenone | | | 2 | | 7.5 | 2 | | 12.5 | | |
| Benzophenone | | 15 | | | 7.5 | | | 12.5 | 25 | 5 |
| Tergitol NP-4 | | 70 | 70 | 70 | 70 | 70 | 90 | 70 | 70 | 70 |
| Total | 100 | 100 | 100 | 100 | 100 | 100 | 100 | 100 | 100 | 100 |
| Asphalt | TYPE IV | TYPE IV | TYPE IV | TYPE IV | TYPE IV | TYPE IV | TYPE IV | TYPE IV | TYPE IV | TYPE IV |

TABLE 18-continued

| Temp.<br>Treatment Level | 230° C.<br>12k<br>% rd'n | 230° C.<br>12k<br>% rd'n | 230° C.<br>12k<br>% rd'n | 230° C.<br>12k<br>% rd'n | 230° C.<br>12k<br>% rd'n | 230° C.<br>12k<br>% rd'n | 230° C.<br>12k<br>% rd'n | 230° C.<br>12k<br>% rd'n | 230° C.<br>12k<br>% rd'n | 230° C.<br>12k<br>% rd'n |
|---|---|---|---|---|---|---|---|---|---|---|
| hydrogen sulfide | 4.8 | 16.2 | 23.6 | 24.7 | 29.9 | 25.6 | 36.8 | 26.0 | 20.3 | 18.0 |
| butane thiol | 8.3 | 37.4 | 43.6 | 44.1 | 18.4 | 20.5 | 39.7 | 28.6 | 18.3 | 18.1 |
| thiophene | 4.9 | 33.1 | 37.8 | 35.3 | 28.5 | 31.5 | 45.3 | 26.4 | 25.7 | 31.8 |
| 2-methyl thiophene | 13.2 | 50.3 | 56.5 | 55.6 | 55.7 | 55.4 | 63.4 | 51.3 | 52.3 | 57.2 |
| ethyl thiophene | 2.6 | 48.3 | 55.7 | 56.5 | 52.6 | 50.3 | 58.8 | 46.3 | 46.3 | 49.4 |
| pentane thiol | 8.2 | 46.7 | 51.6 | 52.5 | 52.5 | 44.3 | 56.6 | 46.7 | 41.0 | 53.3 |
| hexane thiol | 6.5 | 49.7 | 51.6 | 47.7 | 49.7 | 40.6 | 55.5 | 41.3 | 45.2 | 45.2 |
| dimethyl disulfide | 1.2 | 48.4 | 58.1 | 55.2 | 49.2 | 47.6 | 58.1 | 43.5 | 45.6 | 53.6 |
| dibenzothiophene | 0.7 | 49.3 | 47.1 | 52.2 | 47.8 | 47.8 | 56.3 | 40.4 | 41.5 | 48.2 |
| butyl dibenzothiophene | −3.6 | 45.5 | 50.0 | 53.6 | 45.5 | 42.7 | 53.6 | 37.3 | 38.2 | 44.5 |
| benzene thiol | 13.0 | 45.5 | 48.0 | 52.0 | 52.0 | 48.0 | 59.3 | 46.3 | 44.7 | 51.2 |
| methylbenzenethiol | 3.8 | 44.3 | 45.6 | 49.4 | 49.4 | 46.8 | 53.6 | 41.8 | 40.5 | 48.5 |
| o-cresol | 0.0 | 63.9 | 63.3 | 60.3 | 52.6 | 53.3 | 70.4 | 64.0 | 64.0 | 65.9 |
| p-cresol | 7.9 | 63.1 | 67.8 | 67.8 | 61.0 | 59.8 | 72.0 | 66.9 | 67.4 | 71.9 |
| phenol | 17.1 | 60.6 | 66.8 | 66.0 | 65.0 | 64.1 | 70.7 | 63.3 | 66.2 | 69.1 |
| decene | 3.1 | 38.0 | 48.5 | 48.0 | 48.6 | −5.0 | 59.1 | 40.5 | 42.8 | 49.6 |
| quinoline | 12.9 | 58.0 | 65.1 | 60.8 | 62.4 | 80.1 | 66.6 | 59.6 | 59.3 | 65.0 |
| Average % Odor Reduction | 6.2 | 47.0 | 51.8 | 51.9 | 48.3 | 44.3 | 57.4 | 45.3 | 44.7 | 49.4 |

From the data set forth in the preceding tables, it can be determined that the inventive compositions performed the same as, or better than, the Competitor Sample D.

Example 7

Inventive Composition Odor Reducing Potential

A composition formed of 10% by weight vanillin and 90% by weight Tergitol NP4 was prepared and labeled as Sample A. A second inventive sample, Sample B, was prepared that contained the same components as the formulation of Sample A, plus approximately 1% of a low fuming additive (i.e., polypropylene pellets). A control sample (Type III Asphalt with no additives), an after-market additive, deScent 0119 (commercially available from ArrMaz Custom Chemicals, Inc.) (Competitor Sample A), and two competitor commercially treated asphalts, one from United Asphalt Company (Competitor Sample B) and one from Continental Asphalt (Competitor Sample C) were obtained for comparison testing. Inventive Samples A and B and Competitor Samples A, B, and C were each added to Type III molten asphalt and homogeneously mixed in a conventional mixing device. The blended samples, as well as the Control Sample, were then individually tested to determine their odor-reducing potential of Type III Asphalt at temperature conditions of 230° C. and 270° C. for a time period from 0 to 168 hours.

In this example, headspace chromatography was used to measure the odor emissions from the individual samples as described in detail above. The samples were held at 230° C. and 270° C. for up to 168 hours. Emissions were measured and the results were recorded at 0, 4, 24, 48, and 168 hours. The results of these experiments are set forth in Tables 19-24 and in FIGS. 1 and 2. In the tables, 3 k is a 3000:1 treatment level, 6 k is a 6000:1 treatment level, and 12 k is a 12000:1 treatment level.

TABLE 19

CONTROL

| | Storage Temperature | | | | |
|---|---|---|---|---|---|
| | 270° C. | 270° C. | 270° C. | 270° C. | 270° C. |
| | Hours stored @ temp. | | | | |
| | 0 | 4 | 24 | 48 | 168 |
| hydrogen sulfide | 7.09 | 7.16 | 6.98 | 6.92 | 6.72 |
| butane thiol | 6.74 | 6.84 | 5.89 | 6.81 | 6.2 |
| thiophene | 6.58 | 6.58 | 6.83 | 6.53 | 6.12 |
| 2-methyl thiophene | 23.75 | 23.72 | 24.4 | 20.92 | 20.36 |
| ethyl thiophene | 4.26 | 3.71 | 4.58 | 4.14 | 4.42 |
| pentane thiol | 1.75 | 1.89 | 1.67 | 1.73 | 1.79 |
| hexane thiol | 1.78 | 1.68 | 1.74 | 1.89 | 1.88 |
| dimethyl disulfide | 3.26 | 3.51 | 3.55 | 3.38 | 3.56 |
| dibenzothiophene | 3.06 | 2.79 | 2.73 | 2.72 | 2.93 |
| butyl dibenzothiophene | 1.48 | 1.39 | 1.35 | 1.45 | 1.47 |
| benzene thiol | 1.25 | 1.37 | 1.2 | 1.25 | 1.16 |
| methylbenzenethiol | 1.95 | 1.7 | 1.91 | 2.22 | 1.85 |
| o-cresol | 25.43 | 24.63 | 24.57 | 27.16 | 24.69 |
| p-cresol | 25.88 | 22.43 | 25.05 | 23.82 | 25.77 |
| phenol | 42.3 | 41.55 | 38.51 | 46.09 | 41.25 |
| decene | 7.24 | 7.15 | 6.66 | 7.02 | 7.5 |
| quinoline | 34.23 | 31.91 | 31.67 | 33.99 | 34.35 |
| Total Measured Impurities (mg/m³) | 198 | 190 | 189 | 198 | 192 |

TABLE 20

Inventive Sample A
Low Odor Additive

| | Storage Temperature | | | | |
|---|---|---|---|---|---|
| | 270° C. | 270° C. | 270° C. | 270° C. | 270° C. |
| | Hours stored @ temp. | | | | |
| | 0 | 4 | 24 | 48 | 168 |
| hydrogen sulfide | 4.3 | 4.81 | 4.36 | 4.35 | 5.52 |
| butane thiol | 4.57 | 4.72 | 4.82 | 5.53 | 5.66 |
| thiophene | 3.58 | 3.8 | 4.24 | 3.85 | 4.92 |
| 2-methyl thiophene | 8.06 | 7.92 | 6.76 | 10.44 | 18.81 |

TABLE 20-continued

Inventive Sample A
Low Odor Additive

| | Storage Temperature | | | | |
|---|---|---|---|---|---|
| | 270° C. | 270° C. | 270° C. | 270° C. | 270° C. |
| | | | Hours stored @ temp. | | |
| | 0 | 4 | 24 | 48 | 168 |
| ethyl thiophene | 1.92 | 1.89 | 2.15 | 2.82 | 3.1 |
| pentane thiol | 0.8 | 0.76 | 0.8 | 0.76 | 1.26 |
| hexane thiol | 0.85 | 0.88 | 0.85 | 1.12 | 1.86 |
| dimethyl disulfide | 1.7 | 1.63 | 1.83 | 1.9 | 2.98 |
| dibenzothiophene | 1.96 | 2.44 | 2.35 | 2.74 | 2.61 |
| butyl dibenzothiophene | 1.01 | 1.34 | 1.28 | 1.4 | 1.21 |
| benzene thiol | 0.7 | 0.91 | 0.84 | 0.99 | 0.99 |
| methylbenzenethiol | 1.2 | 1.69 | 1.4 | 1.82 | 1.66 |
| o-cresol | 8.12 | 9.62 | 9.61 | 14.28 | 19.03 |
| p-cresol | 8.43 | 7.7 | 10.85 | 15.48 | 18.91 |
| phenol | 11.25 | 14.2 | 13.35 | 18.58 | 26.87 |
| decene | 4.01 | 5.08 | 4.82 | 7.08 | 6.79 |
| quinoline | 11.24 | 13.16 | 13.9 | 18.62 | 26.4 |
| Total Measured Impurities (mg/m³) | 74 | 83 | 84 | 112 | 149 |
| hydrogen sulfide | 39.4 | 32.8 | 37.5 | 37.1 | 17.9 |
| butane thiol | 32.2 | 31.0 | 18.2 | 18.8 | 8.7 |
| thiophene | 45.6 | 42.2 | 37.9 | 41.0 | 19.6 |
| 2-methyl thiophene | 66.1 | 66.6 | 72.3 | 50.1 | 7.6 |
| ethyl thiophene | 54.9 | 49.1 | 53.1 | 31.9 | 29.9 |
| pentane thiol | 54.3 | 59.8 | 52.1 | 56.1 | 29.6 |
| hexane thiol | 52.2 | 47.6 | 51.1 | 40.7 | 1.1 |
| dimethyl disulfide | 47.9 | 53.6 | 48.5 | 43.8 | 16.3 |
| dibenzothiophene | 35.9 | 12.5 | 13.9 | −0.7 | 10.9 |
| butyl dibenzothiophene | 31.8 | 3.6 | 5.2 | 3.4 | 17.7 |
| benzene thiol | 44.0 | 33.6 | 30.0 | 20.8 | 14.7 |
| methylbenzenethiol | 38.5 | 0.6 | 26.7 | 18.0 | 10.3 |
| o-cresol | 68.1 | 60.9 | 60.9 | 47.4 | 22.9 |
| p-cresol | 67.4 | 65.7 | 56.7 | 35.0 | 26.6 |
| phenol | 73.4 | 65.8 | 65.3 | 59.7 | 34.9 |
| decene | 44.6 | 29.0 | 27.6 | −0.9 | 9.5 |
| quinoline | 67.2 | 58.8 | 56.1 | 45.2 | 23.1 |
| AVERAGE % ODOR REDUCTION | 50.8 | 42.0 | 41.9 | 32.2 | 17.7 |

TABLE 21

Inventive Sample B
Low Odor Additive + Low Fuming Additive

| | Storage Temperature | | | | |
|---|---|---|---|---|---|
| | 270° C. | 270° C. | 270° C. | 270° C. | 270° C. |
| | | | Hours stored @ temp. | | |
| | 0 | 4 | 24 | 48 | 168 |
| hydrogen sulfide | 3.31 | 3.22 | 3.45 | 3.34 | 5.42 |
| butane thiol | 4.81 | 4.81 | 4.57 | 4.84 | 5.38 |
| thiophene | 2.5 | 2.52 | 2.43 | 3.95 | 4.47 |
| 2-methyl thiophene | 6.6 | 6.49 | 6.26 | 9.67 | 17.62 |
| ethyl thiophene | 1.32 | 1.36 | 1.16 | 2.71 | 2.88 |
| pentane thiol | 0.71 | 0.71 | 0.75 | 0.69 | 1.21 |
| hexane thiol | 0.58 | 0.58 | 0.57 | 0.55 | 1.82 |
| dimethyl disulfide | 1.33 | 1.38 | 1.87 | 1.59 | 2.56 |
| dibenzothiophene | 1.01 | 1.11 | 1.94 | 1.08 | 2.58 |
| butyl dibenzothiophene | 0.88 | 0.76 | 0.94 | 0.95 | 1.25 |
| benzene thiol | 0.42 | 0.67 | 0.97 | 0.38 | 0.84 |
| methylbenzenethiol | 0.92 | 1.43 | 0.98 | 1.45 | 1.78 |
| o-cresol | 6.9 | 7.93 | 7.88 | 13.91 | 18.52 |
| p-cresol | 6.71 | 6.77 | 9.19 | 13.51 | 15.91 |
| phenol | 8.93 | 10.12 | 10.35 | 14.08 | 22.41 |
| decene | 2.93 | 4.1 | 3.85 | 6.44 | 5.98 |
| quinoline | 9.26 | 9.88 | 12.06 | 16.5 | 22.65 |
| Total Measured Impurities (mg/m³) | 59 | 64 | 69 | 96 | 133 |
| hydrogen sulfide | 53.3 | 55.0 | 50.6 | 51.7 | 19.3 |
| butane thiol | 28.6 | 29.7 | 22.4 | 28.9 | 13.2 |
| thiophene | 62.0 | 61.7 | 64.4 | 39.5 | 27.0 |
| 2-methyl thiophene | 72.2 | 72.6 | 74.3 | 53.8 | 13.5 |
| ethyl thiophene | 69.0 | 63.3 | 74.7 | 34.5 | 34.8 |
| pentane thiol | 59.4 | 62.4 | 55.1 | 60.1 | 32.4 |
| hexane thiol | 67.4 | 65.5 | 67.2 | 70.9 | 3.2 |
| dimethyl disulfide | 59.2 | 60.7 | 47.3 | 53.0 | 28.1 |
| dibenzothiophene | 67.0 | 60.2 | 28.9 | 60.3 | 11.9 |
| butyl dibenzothiophene | 40.5 | 45.3 | 30.4 | 34.5 | 15.0 |
| benzene thiol | 66.4 | 51.1 | 19.2 | 69.6 | 27.6 |
| methylbenzenethiol | 52.8 | 15.9 | 48.7 | 34.7 | 3.8 |
| o-cresol | 72.9 | 67.8 | 67.9 | 48.8 | 25.0 |
| p-cresol | 74.1 | 69.8 | 63.3 | 43.3 | 38.3 |
| phenol | 78.9 | 75.6 | 73.1 | 69.5 | 45.7 |
| decene | 59.5 | 42.7 | 42.2 | 8.3 | 20.3 |
| quinoline | 72.9 | 69.0 | 61.9 | 51.5 | 34.1 |
| AVERAGE % ODOR REDUCTION | 62.1 | 57.0 | 52.5 | 47.8 | 23.1 |

TABLE 22

Competitor Sample A
Competitor Sample A

| | Storage Temperature | | | | |
|---|---|---|---|---|---|
| | 270° C. | 270° C. | 270° C. | 270° C. | 270° C. |
| | | | Hours stored @ temp. | | |
| | 0 | 4 | 24 | 48 | 168 |
| hydrogen sulfide | 6.54 | 6.63 | 6.9 | 6.69 | 6.22 |
| butane thiol | 6.39 | 6.6 | 6.15 | 6.11 | 5.41 |
| thiophene | 5.08 | 5.23 | 4.53 | 5.16 | 5.03 |
| 2-methyl thiophene | 26.39 | 29.62 | 25.18 | 29.86 | 27.98 |
| ethyl thiophene | 4.5 | 4.39 | 4.54 | 4.46 | 3.92 |
| pentane thiol | 1.74 | 1.72 | 1.65 | 1.7 | 1.57 |
| hexane thiol | 1.79 | 1.89 | 1.83 | 2.71 | 1.78 |
| dimethyl disulfide | 3.37 | 3.19 | 3.57 | 3.13 | 3.27 |
| dibenzothiophene | 3.1 | 3 | 3.2 | 3.16 | 3.02 |
| butyl dibenzothiophene | 1.34 | 1.25 | 1.16 | 1.43 | 1.42 |
| benzene thiol | 1.2 | 1.14 | 1.16 | 1.23 | 1.34 |
| methylbenzenethiol | 2.14 | 2.08 | 1.97 | 2.33 | 2.17 |
| o-cresol | 14.68 | 12.7 | 15.68 | 14.93 | 15.88 |
| p-cresol | 16.25 | 16.46 | 18.41 | 15 | 17.62 |
| phenol | 28.49 | 28.15 | 29.98 | 26.27 | 29.9 |
| decene | 6.75 | 6.18 | 7.13 | 7.46 | 6.94 |
| quinoline | 20.63 | 21.45 | 19.35 | 20.15 | 23.48 |
| Total Measured Impurities (mg/m³) | 150 | 152 | 152 | 152 | 157 |
| hydrogen sulfide | 7.8 | 7.4 | 1.1 | 3.3 | 7.4 |
| butane thiol | 5.2 | 3.5 | −4.4 | 10.3 | 12.7 |
| thiophene | 22.8 | 20.5 | 33.7 | 21.0 | 17.8 |
| 2-methyl thiophene | −11.1 | −24.9 | −3.2 | −42.7 | −37.4 |
| ethyl thiophene | −5.6 | −18.3 | 0.9 | −7.7 | 11.3 |
| pentane thiol | 0.6 | 9.0 | 1.2 | 1.7 | 12.3 |
| hexane thiol | −0.6 | −12.5 | −5.2 | −43.4 | 5.3 |
| dimethyl disulfide | −3.4 | 9.1 | −0.6 | 7.4 | 8.1 |
| dibenzothiophene | −1.3 | −7.5 | −17.2 | −16.2 | −3.1 |

TABLE 22-continued

Competitor Sample A
Competitor Sample A

| | Storage Temperature | | | | |
|---|---|---|---|---|---|
| | 270° C. | 270° C. | 270° C. | 270° C. | 270° C. |
| | | | Hours stored @ temp. | | |
| | 0 | 4 | 24 | 48 | 168 |
| butyl dibenzothiophene | 9.5 | 10.1 | 14.1 | 1.4 | 3.4 |
| benzene thiol | 4.0 | 16.8 | 3.3 | 1.6 | −15.5 |
| methylbenzenethiol | −9.7 | −22.4 | −3.1 | −5.0 | −17.3 |
| o-cresol | 42.3 | 48.4 | 36.2 | 45.0 | 35.7 |
| p-cresol | 37.2 | 26.6 | 26.5 | 37.0 | 31.6 |
| phenol | 32.6 | 32.3 | 22.2 | 43.0 | 27.5 |
| decene | 6.8 | 13.6 | −7.1 | −6.3 | 7.5 |
| quinoline | 39.7 | 32.8 | 38.9 | 40.7 | 31.6 |
| AVERAGE % ODOR REDUCTION | 10.4 | 8.5 | 8.1 | 5.4 | 8.2 |

TABLE 23

Competitor Sample B
Competitor Sample B

| | Storage Temperature | | | | |
|---|---|---|---|---|---|
| | 270° C. | 270° C. | 270° C. | 270° C. | 270° C. |
| | | | Hours stored @ temp. | | |
| | 0 | 4 | 24 | 48 | 168 |
| hydrogen sulfide | 8.43 | 8.72 | 8.74 | 8.38 | 7.76 |
| butane thiol | 12.45 | 12.41 | 11.79 | 12.7 | 11.32 |
| thiophene | 8.35 | 8.89 | 9.43 | 9.12 | 8.83 |
| 2-methyl thiophene | 29.13 | 26.27 | 29.96 | 31.27 | 32.3 |
| ethyl thiophene | 4.84 | 4.7 | 5.27 | 5.11 | 4.74 |
| pentane thiol | 2.4 | 2.62 | 2.66 | 2.78 | 2.24 |
| hexane thiol | 2.02 | 1.93 | 2.52 | 2.17 | 2.03 |
| dimethyl disulfide | 4.26 | 4.3 | 4.99 | 4.35 | 4.79 |
| dibenzothiophene | 4.29 | 4.45 | 4.36 | 4.44 | 4.21 |
| butyl dibenzothiophene | 2.01 | 2.12 | 1.97 | 2.14 | 2.08 |
| benzene thiol | 1.89 | 2.15 | 2.22 | 1.88 | 1.83 |
| methylbenzenethiol | 2.79 | 3.05 | 2.42 | 3.08 | 2.81 |
| o-cresol | 26.68 | 26.32 | 30.21 | 30.93 | 29.23 |
| p-cresol | 29.26 | 27.87 | 27.85 | 30.8 | 32.19 |
| phenol | 40.21 | 42.93 | 40.19 | 42.81 | 35.84 |
| decene | 9.34 | 10.3 | 10.82 | 10.89 | 8.4 |
| quinoline | 39.08 | 37.59 | 41.71 | 41.4 | 38.03 |
| Total Measured Impurities (mg/m$^3$) | 227 | 227 | 237 | 244 | 229 |
| hydrogen sulfide | −18.9 | −21.8 | −25.2 | −21.1 | −15.5 |
| butane thiol | −84.7 | −81.4 | −100.2 | −86.5 | −82.6 |
| thiophene | −26.9 | −35.1 | −38.1 | −39.7 | −44.3 |
| 2-methyl thiophene | −22.7 | −10.8 | −22.8 | −49.5 | −58.6 |
| ethyl thiophene | −13.6 | −26.7 | −15.1 | −23.4 | −7.2 |
| pentane thiol | −37.1 | −38.6 | −59.3 | −60.7 | −25.1 |
| hexane thiol | −13.5 | −14.9 | −44.8 | −14.8 | −8.0 |
| dimethyl disulfide | −30.7 | −22.5 | −40.6 | −28.7 | −34.6 |
| dibenzothiophene | −40.2 | −59.5 | −59.7 | −63.2 | −43.7 |
| butyl dibenzothiophene | −35.8 | −52.5 | −45.9 | −47.6 | −41.5 |
| benzene thiol | −51.2 | −56.9 | −85.0 | −50.4 | −57.8 |
| methylbenzenethiol | −43.1 | −79.4 | −26.7 | −38.7 | −51.9 |
| o-cresol | −4.9 | −6.9 | −23.0 | −13.9 | −18.4 |
| p-cresol | −13.1 | −24.3 | −11.2 | −29.3 | −24.9 |
| phenol | 4.9 | −3.3 | −4.4 | 7.1 | 13.1 |
| decene | −29.0 | −44.1 | −62.5 | −55.1 | −12.0 |
| quinoline | −14.2 | −17.8 | −31.7 | −21.8 | −10.7 |
| AVERAGE % ODOR REDUCTION | −27.9 | −35.1 | −40.9 | −37.5 | −30.8 |

TABLE 24

Competitor Sample C
Competitor Sample C

| | Storage Temperature | | | | |
|---|---|---|---|---|---|
| | 270° C. | 270° C. | 270° C. | 270° C. | 270° C. |
| | | | Hours stored @ temp. | | |
| | 0 | 4 | 24 | 48 | 168 |
| hydrogen sulfide | 9.39 | 9.33 | 9.64 | 9.31 | 8.87 |
| butane thiol | 5.36 | 5.24 | 6.44 | 6.39 | 5.81 |
| thiophene | 6.7 | 5.95 | 7.45 | 6.74 | 9.24 |
| 2-methyl thiophene | 11.64 | 12.73 | 11.18 | 14.19 | 19.82 |
| ethyl thiophene | 3.54 | 3.56 | 3.26 | 3.52 | 4.01 |
| pentane thiol | 2.74 | 2.74 | 3.14 | 3.38 | 2.98 |
| hexane thiol | 1.8 | 2.04 | 1.82 | 2.07 | 1.91 |
| dimethyl disulfide | 3.59 | 3.7 | 3.75 | 4.05 | 3.38 |
| dibenzothiophene | 3.42 | 3.5 | 3.48 | 4.19 | 3.26 |
| butyl dibenzothiophene | 1.46 | 1.4 | 1.48 | 1.64 | 1.4 |
| benzene thiol | 2.04 | 2.17 | 2.29 | 1.95 | 2.23 |
| methylbenzenethiol | 1.83 | 1.78 | 1.82 | 1.98 | 1.91 |
| o-cresol | 22.46 | 22.67 | 22.27 | 27.08 | 25.43 |
| p-cresol | 33.84 | 35.61 | 34.67 | 34.05 | 38.55 |
| phenol | 50.62 | 49.9 | 54.66 | 58.05 | 47.72 |
| decene | 8.72 | 8.4 | 10.31 | 9.79 | 7.73 |
| quinoline | 28.51 | 27.68 | 32.17 | 29.71 | 28.17 |
| Total Measured Impurities (mg/m$^3$) | 198 | 198 | 210 | 218 | 212 |
| hydrogen sulfide | −32.4 | −30.3 | −38.1 | −34.5 | −32.0 |
| butane thiol | 20.5 | 23.4 | −9.3 | 6.2 | 6.3 |
| thiophene | −1.8 | 9.6 | −9.1 | −3.2 | −51.0 |
| 2-methyl thiophene | 51.0 | 46.3 | 54.2 | 32.2 | 2.7 |
| ethyl thiophene | 16.9 | 4.0 | 28.8 | 15.0 | 9.3 |
| pentane thiol | −56.6 | −45.0 | −88.0 | −95.4 | −66.5 |
| hexane thiol | −1.1 | −21.4 | −4.6 | −9.5 | −1.6 |
| dimethyl disulfide | −10.1 | −5.4 | −5.6 | −19.8 | 5.1 |
| dibenzothiophene | −11.8 | −25.4 | −27.5 | −54.0 | −11.3 |
| butyl dibenzothiophene | 1.4 | −0.7 | −9.6 | −13.1 | 4.8 |
| benzene thiol | −63.2 | −58.4 | −90.8 | −56.0 | −92.2 |
| methylbenzenethiol | 6.2 | −4.7 | 4.7 | 10.8 | −3.2 |
| o-cresol | 11.7 | 8.0 | 9.4 | 0.3 | −3.0 |
| p-cresol | −30.8 | −58.8 | −38.4 | −42.9 | −49.6 |
| phenol | −19.7 | −20.1 | −41.9 | −25.9 | −15.7 |
| decene | −20.4 | −17.5 | −54.8 | −39.5 | −3.1 |
| quinoline | 16.7 | 13.3 | −1.6 | 12.6 | 18.0 |
| AVERAGE % ODOR REDUCTION | −7.3 | −10.8 | −19.0 | −18.6 | −16.7 |

As shown in Tables 19-24 and in FIGS. 1 and 2, the inventive compositions demonstrated a marked odor reduction compared to the competitor samples at both 230° C. and 270° C. Initially, Inventive Sample A had an average odor reduction of 51% and Inventive Sample B had an average odor reduction of 62%. Comparatively, the closest competitor sample, Sample C, demonstrated an initial average odor reduction of only 10%. Additionally, it can be seen in Tables 20 and 21 that both Inventive Samples A and B demonstrated at least a 50% reduction in the measured impurities for up to 24 hours compared to the closest competitor's sample, Competitor Sample A. Inventive Sample B demonstrated at least a 47% reduction in impurities for up to 48 hours.

Turning to FIG. 1, at 230° C., Inventive Samples A and B demonstrated a nearly constant reduction of the odor emitted from the asphalt over the 168 hour storage period. At 270° C., the inventive samples showed a substantially stable and minimal odor emission up to approximately 24 hours, at which time the odor reducing potential was somewhat decreased. However, it is important to note that even at 168 hours of storage time; the inventive samples still demonstrated an improvement in odor reduction over the competitors samples (i.e., Competitor Samples A, B, and C) and the Control Sample.

In addition, it can be seen from Tables 21 and 22 and FIGS. 1 and 2 that the addition of the low fuming agent to Inventive Sample B caused an additional improvement in the odor reduction of the asphalt. It is believed that the low fuming additive created a synergistic affect, thus lowering the odor emissions even greater than Inventive Sample A, which contained no low fuming additive.

The invention of this application has been described above both generically and with regard to specific embodiments. Therefore, it is to be understood that a wide variety of alternatives known to those of skill in the art can be selected within the generic disclosure. The invention is not otherwise limited, except for the recitation of the claims set forth below.

Having thus described the invention, what is claimed is:

1. A composition for reducing malodorous emissions from hydrocarbonaceous materials comprising:
   at least one aldehyde-containing compound having a molecular weight greater than about 100 daltons and a boiling point greater than about 375° F., and
   at least one ketone-containing compound having a boiling point greater than about 375° F. and a molecular weight greater than about 100 daltons, said composition being free of ester-containing compounds.

2. The composition of claim 1, further comprising one or more members selected from the group consisting of a low fuming additive and a liquid carrier.

3. The composition of claim 2, further comprising a liquid carrier, wherein said liquid carrier has a boiling point greater than about 375° F. and is ester-free.

4. The composition of claim 1, wherein said aldehyde-containing compound is selected from the group consisting of 2-chlorobenzaldehyde, 4-chlorobenzaldehyde, alpha-methylcinnamaldehyde, 4-anisaldehyde, epsilon-cinnamaldehyde, vertraldehyde, 4-ethoxy-3-methoxybenzaldehyde, 3-ethoxy-4-hydroxybenzaldehyde, 3-nitrobenzaldehyde, vanillin and cinnamaldehyde.

5. The composition of claim 1, wherein said ketone-containing compound is selected from the group consisting of camphor, isophorone, isobutyrophenone, propiophenone, 4-methylacetophenone, carvone, 4-chloroacetophenone, 2-benzoylbenzoic acid, 2'-acetonaphthone, benzophenone, fluorenone, 4'-ethoxyacetophenone, 4'-chlorobenzophenone, 4-acetylbenzonitrile and 4'-hydroxyacetophenone.

6. The composition of claim 1, wherein said hydrocarbonaceous material is asphalt.

7. The composition of claim 1, wherein a polymer is attached to said aldehyde-containing compound to form a polymer/aldehyde compound and wherein said polymer/aldehyde compound has a molecular weight from about 1,000 to about 10,000,000 daltons.

8. The composition of claim 1, wherein said aldehyde-containing compound is vanillin.

9. A low odor hydrocarbonaceous material comprising:
   a hydrocarbonaceous material; and
   an odor reducing amount of a composition including one or more aldehyde-containing compounds, said one or more aldehyde-containing compounds having a molecular weight greater than about 100 daltons and a boiling point greater than about 375° F.,
   wherein said composition reduces odors in the absence of ester-containing compounds.

10. The low odor hydrocarbonaceous material of claim 9, further comprising one or more members selected from the group consisting of at least one ketone-containing compound, a low fuming additive and a liquid carrier.

11. The low odor hydrocarbonaceous material of claim 10, further comprising at least one ketone-containing compound having a boiling point greater than about 375° F. and a molecular weight greater than about 100 daltons.

12. The low odor hydrocarbonaceous material of claim 9, wherein said hydrocarbonaceous material is asphalt.

13. The low odor hydrocarbonaceous material of claim 12, wherein said odor-reducing amount is from about 0.1% to about 5.0% of said composition by volume of said asphalt.

14. The low odor hydrocarbonaceous material of claim 12, wherein said asphalt is packaged in a consumable material.

15. The low odor hydrocarbonaceous material of claim 9, wherein said aldehyde-containing compound is vanillin.

16. A method for reducing odor in a hydrocarbonaceous material comprising:
   mixing an odor reducing amount of a composition comprising at least one aldehyde-containing compound having a molecular weight greater than about 100 daltons and a boiling point greater than about 375° F. to a hydrocarbonaceous material, said composition being free of ester-containing compounds.

17. The method of claim 16, wherein said composition further comprises one or more members selected from at least one ketone-containing compound, a low fuming additive and a liquid carrier.

18. The method of claim 16, wherein a polymer is attached to said aldehyde-containing compound to form a polymer/aldehyde compound and wherein said polymer/aldehyde compound has a molecular weight from about 1,000 to about 10,000,000 daltons.

19. A composition for reducing malodorous emissions from hydrocarbonaceous materials comprising:
   at least one aldehyde-containing compound having a molecular weight greater than about 100 daltons and a boiling point greater than about 375° F., and
   a polymer attached to said aldehyde-containing compound to form a polymer/aldehyde compound and wherein said polymer/aldehyde compound has a molecular weight from about 1,000 to about 10,000,000 daltons.

20. The composition of claim 19, wherein said aldehyde-containing compound is selected from the group consisting of 2-chlorobenzaldehyde, 4-chlorobenzaldehyde, alpha-methylcinnamaldehyde, 4-anisaldehyde, epsilon-cinnamaldehyde, vertraldehyde, 4-ethoxy-3-methoxybenzaldehyde, 3-ethoxy-4-hydroxybenzaldehyde, 3-nitrobenzaldehyde, vanillin and cinnamaldehyde.

* * * * *